US011275001B2

(12) United States Patent
Czerniawski et al.

(10) Patent No.: US 11,275,001 B2
(45) Date of Patent: Mar. 15, 2022

(54) ON-AXIS, ANGLED, ROTATOR FOR X-RAY IRRADIATION

(71) Applicant: Rad Source Technologies, Inc., Buford, GA (US)

(72) Inventors: Justin M. Czerniawski, Roswell, GA (US); Peter M. Mitchell, Suwanee, GA (US)

(73) Assignee: Rad Source Technologies, Inc., Buford, GA (US)

( * ) Notice: Subject to any disclaimer, the term of this patent is extended or adjusted under 35 U.S.C. 154(b) by 0 days.

(21) Appl. No.: 16/938,523

(22) Filed: Jul. 24, 2020

(65) Prior Publication Data

US 2021/0025796 A1 Jan. 28, 2021

Related U.S. Application Data

(60) Provisional application No. 62/879,272, filed on Jul. 26, 2019.

(51) Int. Cl.
*G01N 1/44* (2006.01)
*G21K 5/08* (2006.01)
*G21K 5/10* (2006.01)

(52) U.S. Cl.
CPC ............. *G01N 1/44* (2013.01); *G21K 5/08* (2013.01); *G21K 5/10* (2013.01); *G21K 2207/00* (2013.01)

(58) Field of Classification Search
CPC .. G01N 1/44; G21K 5/08; G21K 5/10; G21K 2207/00
USPC ... 250/453.11, 454.11, 455.11, 492.1, 492.2, 250/492.21, 492.22, 492.23, 492.3
See application file for complete search history.

(56) References Cited

U.S. PATENT DOCUMENTS

| 2010/0090123 A1* | 4/2010 | Tajiri | ............. G21K 5/00 250/398 |
| 2018/0029254 A1* | 2/2018 | Gaab | ............. B29C 35/08 |

* cited by examiner

*Primary Examiner* — Nicole M Ippolito
(74) *Attorney, Agent, or Firm* — Phillip Pippenger

(57) ABSTRACT

An on-axis, angled, rotator device is disclosed. The rotator device may include a container containing a slot for receiving a sample. An angle of the slot may be configured to be between 0 and 180 degrees relative to a perpendicular irradiation plane of a radiation device. The rotator device may include a cup positioned within an opening of the container. Additionally, the rotator device may include a driveshaft configured to transmit torque to cause the cup to be rotated when the cup is positioned within the opening. When the sample resides within the slot and the driveshaft transmits the torque to the cup, the cup may cause the sample to rotate about a center axis of the sample. The angle of the slot containing the sample and the rotation of the sample about the center axis may facilitate uniform radiation exposure to the sample when the radiation device emits radiation.

24 Claims, 23 Drawing Sheets

ON-AXIS, ANGLED, ROTATOR FOR X-RAY IRRADIATION

CROSS-REFERENCE TO RELATED APPLICATIONS

This application claims priority to and the benefit of U.S. Provisional Patent Application Ser. No. 62/879,272, filed on Jul. 26, 2019, the entire contents of which are incorporated by reference herein. Additionally, the entire disclosure of U.S. patent application Ser. No. 09/709,896, filed on Nov. 13, 2000, now U.S. Pat. No. 6,389,099, is incorporated by reference in its entirety.

FIELD OF THE INVENTION

The present application relates to irradiation technologies, radiation technologies, rotator technologies, temperature regulation technologies, x-ray tube technologies, and more particularly, to an on-axis, angled, rotator for x-ray irradiation and methods of using the on-axis, angled, rotator for x-ray irradiation.

BACKGROUND

In the world of photon sterilization, uniformity and dose rate of radiation are critical in achieving successful sterilization. For the purposes of this disclosure, uniformity may be the ratio of the highest dose of radiation to the lowest dose of radiation emitted from a radiation device, such as an x-ray tube. Typically, increasing the highest dose comes at the expense of the lowest dose and vice versa. As a result, high dose and uniformity, such as when irradiating various types of samples, is often difficult to achieve. Notably, position in a radiation field is very important to the rate and uniformity of the exposure dose that a particular sample receives from a radiation device. Radiation devices, such as x-ray tubes, suffer from an anode heel effect and do not distribute radiation uniformly in their perpendicular plane. For example, in currently existing applications, samples may be positioned in front of the incident radiation window of the radiation device, and, as a result, the samples must be held far away from the origin of the radiation (e.g. the radiation device) to create an even distribution of photon dose across the exposed side of the sample. The sample's distance away from the origin of the radiation causes a drop in the amount of dose that the sample receives and increases the total exposure time a sample needs to accumulate large doses. As a result, this makes it very difficult for an x-ray tube or other radiation device to create highly uniform fields with a high dose rate and limits a radiation device's viability for applications, such as, but not limited to, virus deactivation and x-ray sterilization.

Another issue with existing technologies is that certain irradiation applications require temperature control, such as cooling. Notably, existing irradiation technologies are unable to compensate for uniformity, dosage rate, and temperature regulation. Additionally, currently existing technologies are not readily useable with different radiation devices, unless there are substantial modifications that are made to adapt the technology with each different radiation device. While current technologies provide for many benefits and efficiencies, these technologies can be substantially improved and enhanced. In particular, current technologies may be improved so as to provide increased uniformity of radiation exposure, increased radiation dosage rates, and increased temperature control. Such enhancements and improvements to methodologies and technologies may provide for increased efficiency, increased effectiveness, reduced costs, and increased ease-of-use.

SUMMARY

A system and accompanying methods for providing an on-axis, angled, rotator device for x-ray irradiation are disclosed. In particular, the system and methods take advantage of the discovery that when an object is angled between 0 and 180 degrees in a perpendicular irradiation plane of a radiation device, the geometric limitations of the radiation device (e.g. x-ray tube) are reduced dramatically. Such geometric limitations may be further reduced by rotation of a sample along the sample's center axis. By angling and rotating a sample in the radiation field (e.g. an x-ray field) of the radiation device, the sample may be held close to the radiation device (i.e. at a high dosage rate zone of the radiation field) without sacrificing radiation exposure uniformity. In certain embodiments, the system and methods utilize the positioning in conjunction with reflective material (e.g. reflective material and technology as provided in U.S. Pat. No. 6,389,099) to create an advanced rotation mechanism that positions samples and rotates the samples in place. By doing so, uniformity of radiation exposure and dosage rate is maximized by using the rotator device, which complements the photon output geometry of any radiation device, such as an x-ray tube.

Notably, the mechanisms, positioning and/or motion provided by the system and methods may be readily adapted to any radiation device manufacturer's device (e.g. x-ray tube devices). Additionally, the system and methods facilitate temperature control of the samples via the rotator device. For example, the dry ice (or another suitable substance) may be placed into various portions of the rotator device to keep the samples that are rotating in the rotator device chilled. In certain embodiments, the rotator device may be equipped with a heating element to keep samples warm if so desired. Notably, the angled geometry provided by the system and methods via the rotator device also allows for more efficient sample placement so that more samples may benefit from the high uniform dose compared to the conventional method, which involves laying the samples flat. In certain additional embodiments, a sample may be angled between two or more sources of radiation and may benefit from complementing the tube geometries.

In one embodiment, a system for providing an on-axis, angled, rotator for x-ray irradiation is provided. The system may include a memory that stores instructions and a processor that executes the instructions to perform various operations of the system. The system may perform an operation that includes facilitating positioning of a vial (tubes, containers, and/or other devices capable of storing samples) containing a sample into a slot of a container of a rotator device. In certain embodiments, an angle of the slot of the container may be between 0 and 180 degrees relative to a perpendicular irradiation plane of a radiation device. The system may then perform an operation that includes facilitating positioning of a cup into the container of the rotator device. In certain embodiments, the cup may contact the vial when the cup is positioned in the container and the vial containing the sample is positioned in the slot. In certain embodiments, the cup may contact the vial via an O-ring or other similar component positioned on a surface of the cup. The system may proceed to perform an operation that includes facilitating positioning of the rotator device within range of a radiation field of the radiation device. Furthermore, the system may perform an operation that includes facilitating the transmission of torque to the cup, such as via a driveshaft of the rotator device. In certain embodiments, the torque may cause the cup to rotate, thereby causing the cup to rotate the vial containing the sample about a center axis of the vial containing the sample. Notably, the angle of the slot and the rotation of the sample about the center axis may facilitate uniform radiation exposure to the sample in the vial when the radiation device emits radiation.

In another embodiment, an on-axis, angled, rotator device is disclosed. The rotator device may include a container containing a slot for receiving a sample. An angle of the slot of the container may be configured to be between 0 and 180 degrees relative to a perpendicular irradiation plane of a radiation device. The rotator device may also include a cup configured to be positioned within an opening of the container and configured to contact the sample when the sample is contained in the slot. Additionally, the rotator device may include a driveshaft configured to transmit torque to cause the cup to be rotated when the cup is positioned within the opening of the container. Notably, when the sample resides within the slot and the driveshaft transmits the torque to the cup, the cup may cause the sample to rotate about a center axis of the sample. Furthermore, the angle of the slot containing the sample and the rotation of the sample about the center axis may facilitate uniform radiation exposure to the sample when the radiation device emits radiation.

In another embodiment, a method for utilizing an on-axis, angled, rotator device is provided. In certain embodiments, the method may include utilizing a memory that stores instructions, and a processor that executes the instructions to perform the various functions of the method. In certain embodiments, a human may facilitate some or all of the steps of the method. The method may include positioning a vial containing a sample into a slot of a container of a rotator device. In certain embodiments, an angle of the slot of the container may be between 0 and 180 degrees relative to a perpendicular irradiation plane of a radiation device. The method may then include positioning a cup into the container. The cup may contact the vial when the cup is positioned in the container and the vial containing the sample is positioned in the slot. Additionally, the method may include positioning the rotator device within range of a radiation field of the radiation device. Furthermore, the method may include transmitting, via a driveshaft of the rotator device, torque to the cup. The torque may cause the cup to rotate, thereby causing the cup to rotate the vial containing the sample about a center axis of the vial containing the sample. The angle of the slot and the rotation of the sample about the center axis may facilitate uniform radiation exposure to the sample in the vial when the radiation device emits radiation.

In yet another embodiment, another on-axis, angled, rotator device is disclosed. The device may include a first container containing a slot for receiving a sample. In certain embodiments, an angle of the slot of the container is between 0 and 180 degrees relative to a perpendicular irradiation plane of a radiation device. The device may also include a second container configured to be positioned within the first container and configured to contact the sample when the sample is contained in the slot. The device may further include a driveshaft configured to transmit torque to the second container to cause the second container to rotate. When the sample resides within the slot and the second container rotates, the rotation of the second container may cause the sample to rotate about a center axis of the sample. The angle of the slot containing the sample and the rotation of the sample about the center axis may facilitate uniform radiation exposure to the sample when the radiation device emits radiation.

According to yet another embodiment, another device is provided. The device may include a radiation device configured to emit radiation. In certain embodiments, the radiation device may be part of the device or separate from the device. The device may also include a container, a first tube (e.g. vial) positioned in the container and for receiving a first sample, and a second tube positioned in the container and for receiving a second sample. In certain embodiments, the second tube may be positioned adjacent to the first tube and may face a direction opposing the first tube. In certain embodiments, the first tube and the second tube may be positioned at angles relative to a perpendicular irradiation plane of the radiation device such that uniform radiation exposure to the first and second samples may occur when the radiation device emits radiation towards the container of the device.

These and other features of the systems and methods for providing an on-axis, angled, rotator for x-ray irradiation are described in the following detailed description, drawings, and appended claims.

DETAILED DESCRIPTION OF THE DRAWINGS

Figure 1:
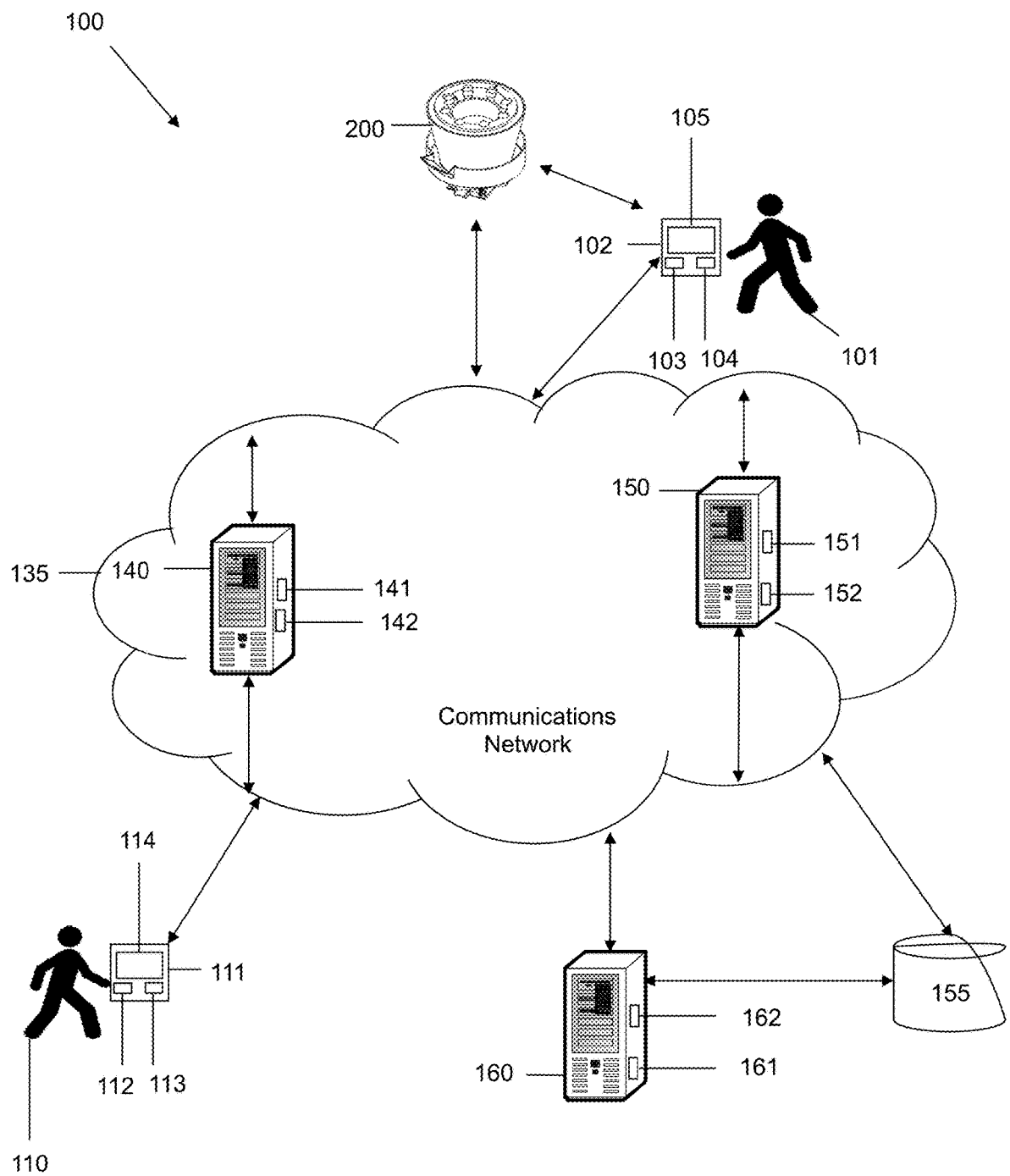
FIG. 1 is a schematic diagram of a system for providing and utilizing an on-axis, angled, rotator for x-ray irradiation according to an embodiment of the present disclosure.
Figure 2:
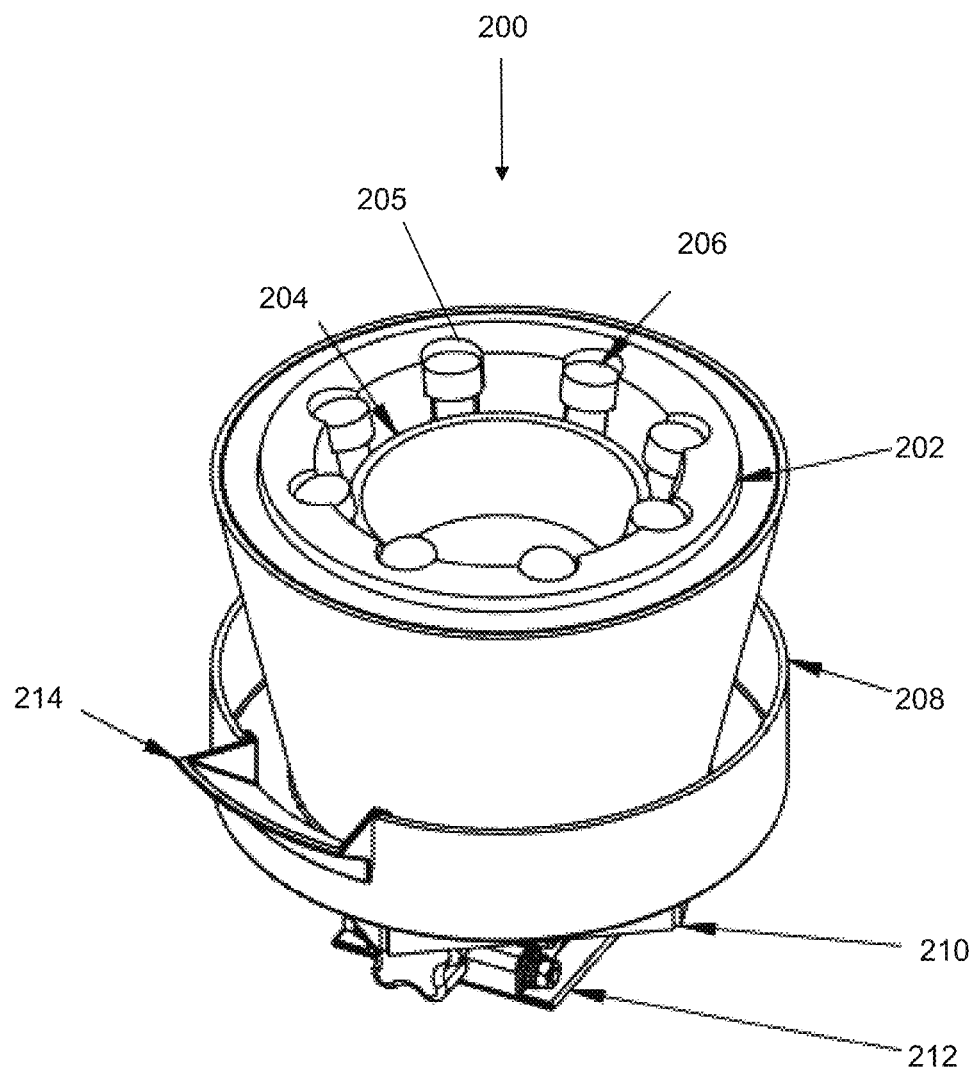
FIG. 2 is a front angle perspective view of the on-axis, angled, rotator for x-ray irradiation of FIG. 1 according to an embodiment of the present disclosure.
Figure 3:
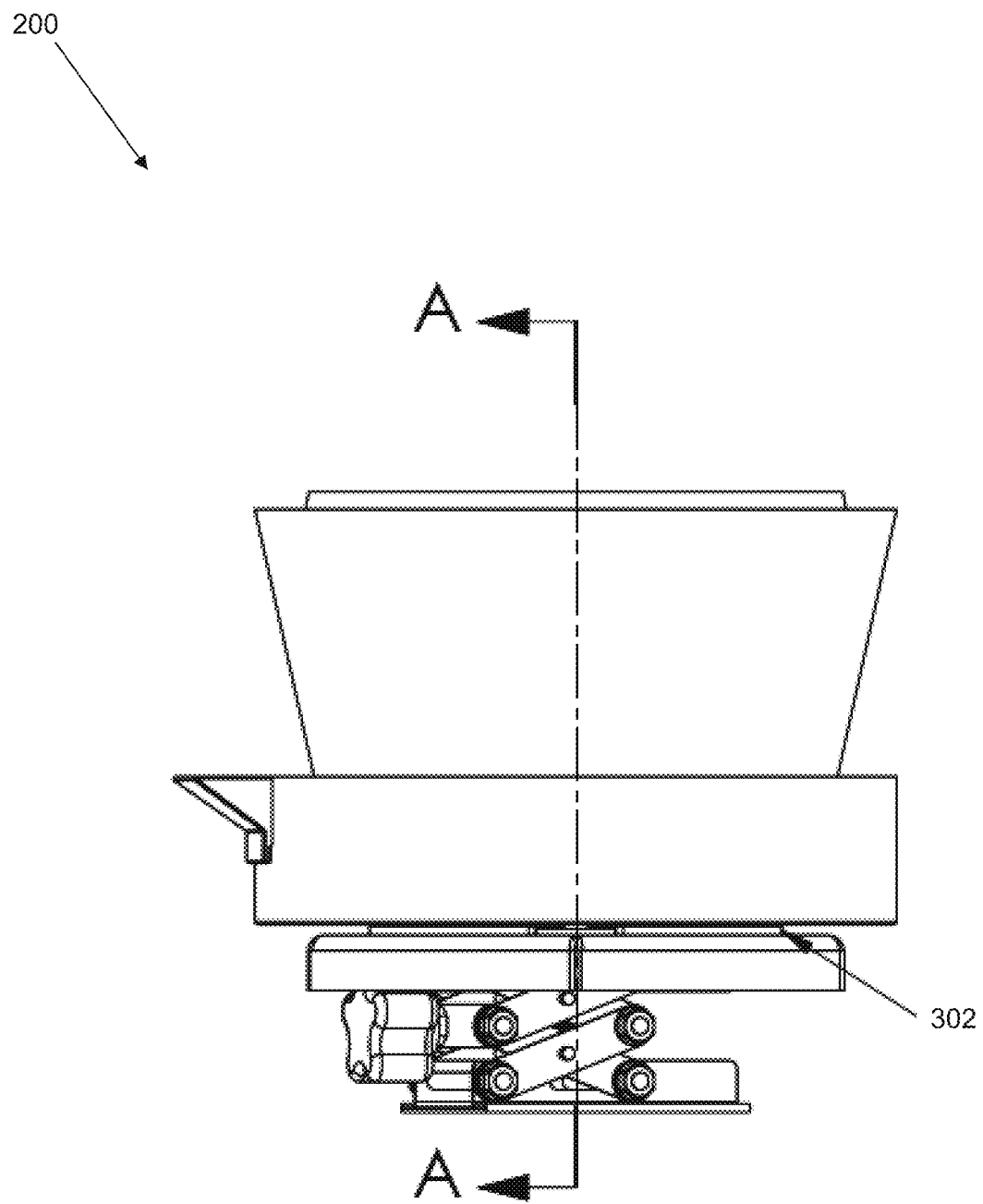
FIG. 3 is a side view of the on-axis, angled, rotator for x-ray irradiation of FIG. 1 according to an embodiment of the present disclosure.

A system 100 and accompanying methods for providing an on-axis, angled, rotator 200 for x-ray irradiation are disclosed. In particular, the system 100 and methods take advantage of the discovery that when an object is angled between 0 and 180 degrees in a perpendicular irradiation plane of a radiation device 800, the geometric limitations of the radiation device 800 (e.g. x-ray tube) may be reduced dramatically. Such geometric limitations may be further reduced by rotation of a sample along the sample's center axis. By angling and rotating a sample in the radiation field (e.g. an x-ray field) of the radiation device 800, the sample may be held close to the radiation device 800 (i.e. at a high dosage rate zone of the radiation field) without sacrificing radiation exposure uniformity. In certain embodiments, the system 100 and methods utilize the positioning in conjunction with reflective material (e.g. reflective material and technology as provided in U.S. Pat. No. 6,389,099) to create an advanced rotation mechanism that positions samples and rotates the samples in place. By doing so, uniformity of radiation exposure and dosage rate is maximized by using the rotator device 200, which may complement the photon output geometry of any radiation device, such as an x-ray tube.

Notably, the mechanisms, positioning and/or motion provided by the system 100 and methods may be readily adapted to any radiation device manufacturer's device. Additionally, the system 100 and methods facilitate temperature control of the samples via the rotator device 200 itself. For example, the dry ice (or another suitable substance) may be placed into various portions of the rotator device 200 to keep the samples that are rotating in the rotator device 200 at a desired temperature. In certain embodiments, the rotator device 200 may be equipped with a heating element to keep samples warm if desired. Notably, the angled geometry provided by the system 100 and methods via the rotator device 200 also allows for more efficient sample placement so that more samples may benefit from the high uniform dose compared to the conventional method, which involves laying the samples flat. In certain additional embodiments, a sample may be angled between two or more sources of radiation and may benefit from complementing the tube geometries.

Still further, the system 100 and methods utilize the rotator device 200 to hold samples, such as, but not limited to, vials, tubes, medical implants, and/or containers at an angle that complements the geometry of a radiation device's 800 radiation output. Mechanisms of the rotator device 200 may also rotate the samples along their individual center axes so that the photon exposure to the samples is even throughout the samples themselves. The goal is to facilitate the creation of a dose rate at the center of the sample that is as close to the dose rate at the surface as possible. In certain embodiments and as indicated above, the rotator device 200 may enable temperature control of the samples to be irradiated by the radiation device 800, which can allow for hot, cold, or other temperature insulation. In certain embodiments, the rotator device 200 may place certain or all samples at an angle relative to the radiation device 800 so that cooler photon emission areas are closer in proximity and hotter photon emission areas are further in proximity. This may compensate for any geometry of the radiation device 800 itself, and may thus allow for more uniform doses from the radiation device 800 without sacrificing dosing rate.

As shown in FIG. 1 and referring also to FIGS. 1-23, a system 100 for an on-axis, angled, rotator device 200 for x-ray irradiation is disclosed. Notably, in certain embodiments, the rotator device 200 may be manually operated by a user, such as first user 101 and/or second user 110. For example, the rotator device 200 may be activated via a switch of the rotator device 200 and deactivated via the same switch or a different switch. In certain embodiments, the rotator device 200 may be entirely operated by utilizing the system 100 or operated by using a companying of a user and the system 100. Notably, the system 100 may be configured to support, but is not limited to supporting, radiation devices, services for facilitating operation of a radiation device, services for facilitating operation of the rotator device 200, temperature control services, services for facilitating movement of components of the rotator device 200, content delivery services, surveillance and monitoring services, cloud computing services, satellite services, telephone services, voice-over-internet protocol services (VoIP), software as a service (SaaS) applications, platform as a service (PaaS) applications, gaming applications and services, social media applications and services, operations management applications and services, productivity applications and services, mobile applications and services, and/or any other computing applications and services.

Notably, the system 100 may include a first user 101, who may utilize a first user device 102 to access data, content, and services, or to perform a variety of other tasks and functions. As an example, the first user 101 may utilize first user device 102 to transmit signals to access various online services and content, such as those available on an internet, on other devices, and/or on various computing systems. In certain embodiments, the first user 101 may be an individual that may seek to irradiate samples of food, viruses, bacteria, medical devices, blood, *cannabis*, plants, cells, cosmetics, agricultural products, packaging, any object, any substance, or a combination thereof. In certain embodiments, the first user 101 may be a robot, a computer, a program, a process, any type of user, or any combination thereof. The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102 and to interact with the system 100. In certain embodiments, the first user device 102 may be and/or may include a computer, any type of sensor, a laptop, a set-top-box, a tablet device, a phablet, a server, a mobile device, a smartphone, a smart watch, and/or any other type of computing device. Illustratively, the first user device 102 is shown as a smartphone device in FIG. 1. In certain embodiments, the first user device 102 may be utilized by the first user 101 to control the operative functionality of the rotator device 200 and/or other devices in the system 100.

In addition to using first user device 102, the first user 101 may also utilize and/or have access to additional user devices. As with first user device 102, the first user 101 may utilize the additional user devices to transmit signals to access various online services and content. The additional user devices may include memories that include instructions, and processors that executes the instructions from the memories to perform the various operations that are performed by the additional user devices. In certain embodiments, the processors of the additional user devices may be hardware, software, or a combination thereof. The additional user devices may also include interfaces that may enable the first user 101 to interact with various applications executing on the additional user devices and to interact with the system 100. In certain embodiments, the additional user devices may be and/or may include a computer, any type of sensor, a laptop, a set-top-box, a tablet device, a phablet, a server, a mobile device, a smartphone, a smart watch, and/or any other type of computing device, and/or any combination thereof.

The first user device 102 and/or additional user devices may belong to and/or form a communications network. In certain embodiments, the communications network may be a local, mesh, or other network that enables and/or facilitates various aspects of the functionality of the system 100. In certain embodiments, the communications network may be formed between the first user device 102 and additional user devices through the use of any type of wireless or other protocol and/or technology. For example, user devices may communicate with one another in the communications network by utilizing any protocol and/or wireless technology, satellite, fiber, or any combination thereof. Notably, the communications network may be configured to communicatively link with and/or communicate with any other network of the system 100 and/or outside the system 100.

In certain embodiments, the first user device 102 and additional user devices belonging to the communications network may share and exchange data with each other via the communications network. For example, the user devices may share information relating to the various components of the user devices, information identifying the locations of the user devices, information indicating the types of sensors that are contained in and/or on the user devices, information identifying the applications being utilized on the user devices, information identifying how the user devices are being utilized by a user, information identifying an orientation of the user devices and/or the vials/tubes held in the rotator device 200, information identifying user profiles for users of the user devices, information identifying device profiles for the user devices, information identifying the number of devices in the communications network, information identifying devices being added to or removed from the communications network, any other information, or any combination thereof.

In addition to the first user 101, the system 100 may also include a second user 110, who may utilize a second user device 111 to perform a variety of functions. For example, the second user device 111 may be utilized by the second user 110 to transmit signals to request various types of content, services, and data provided by and/or accessible by communications network 135 or any other network in the system 100. In certain embodiments, the second user 110 may be an individual that may seek to irradiate food, viruses, bacteria, medical devices, blood, cannabis, plants, cells, cosmetics, agricultural products, packaging, any object, any substance, or a combination thereof. In further embodiments, the second user 110 may be a robot, a computer, a program, a process, any type of user, or any combination thereof. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g. screen, monitor, graphical user interface, etc.) that may enable the second user 110 to interact with various applications executing on the second user device 111 and to interact with the system 100. In certain embodiments, the second user device 111 may be a computer, a laptop, a set-top-box, a tablet device, a phablet, a server, a mobile device, a smartphone, a smart watch, and/or any other type of computing device. Illustratively, the second user device 111 is shown as a tablet device in FIG. 1.

In certain embodiments, the first user device 102, the additional user devices, and/or the second user device 111 may have any number of software applications and/or application services stored and/or accessible thereon. For example, the first user device 102, the additional user devices, and/or the second user device 111 may include applications for controlling the rotator device 200, applications for controlling the radiation device 800, applications for controlling any device of the system 100, interactive social media applications, biometric applications, cloud-based applications, VoIP applications, other types of phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications may support the functionality provided by the system 100 and methods described in the present disclosure. In certain embodiments, the software applications and services may include one or more graphical user interfaces so as to enable the first and second users 101, 110 to readily interact with the software applications. The software applications and services may also be utilized by the first and second users 101, 110 to interact with any device in the system 100, any network in the system 100, or any combination thereof. In certain embodiments, the first user device 102, the additional user devices, and/or the second user device 111 may include associated telephone numbers, device identities, or any other identifiers to uniquely identify the first user device 102, the additional user devices, and/or the second user device 111.

The system 100 may also include a communications network 135. The communications network 135 may be under the control of a service provider, the first user 101, the second user 110, any other designated user, a computer, another network, or a combination thereof. The communications network 135 of the system 100 may be configured to link each of the devices in the system 100 to one another. For example, the communications network 135 may be utilized by the first user device 102 to connect with other devices within or outside communications network 135, such as, but not limited to, the radiation device 800 and/or the rotator device 200. Additionally, the communications network 135 may be configured to transmit, generate, and receive any information and data traversing the system 100. In certain embodiments, the communications network 135 may include any number of servers, databases, or other componentry. The communications network 135 may also include and be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, any network, or any combination thereof. Illustratively, servers 140, 145, and 150 are shown as being included within communications network 135. In certain embodiments, the communications network 135 may be part of a single autonomous system that is located in a particular geographic region, or be part of multiple autonomous systems that span several geographic regions.

Notably, the functionality of the system 100 may be supported and executed by using any combination of the servers 140, 145, 150, and 160. The servers 140, 145, and 150 may reside in communications network 135, however, in certain embodiments, the servers 140, 145, 150 may reside outside communications network 135. The servers 140, 145, and 150 may provide and serve as a server service that performs the various operations and functions provided by the system 100. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. Furthermore, the server 150 may include a memory 151 that includes instructions, and a processor 152 that executes the instructions from the memory 151 to perform the various operations that are performed by the server 150. In certain embodiments, the servers 140, 145, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 145, 150 may be communicatively linked to the communications network 135, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operation associated with the database 155. In certain embodiments, the database 155 may be connected to the servers 140, 145, 150, 160, the first user device 102, the second user device 111, the additional user devices, the radiation device 800, the rotator device 200, any devices in the system 100, any process of the system 100, any program of the system 100, any other device, any network, or any combination thereof.

The database 155 may also store information and metadata obtained from the system 100, store metadata and other information associated with the first and second users 101, 110, store data generated by the radiation device 800, store data generated by the rotator device 200, store temperature readings obtained via sensors of the rotator device 200, storing any type of sensor reading from any type of sensor of the rotator device 200, store orientation and/or rotation information associated with the slots and/or vials/tubes held in the slots of the rotator device 200, store user profiles associated with the first and second users 101, 110, store device profiles associated with any device in the system 100, store communications traversing the system 100, store user preferences, store information associated with any device or signal in the system 100, store information relating to patterns of usage relating to the user devices 102, 111, store any information obtained from any of the networks in the system 100, store historical data associated with the first and second users 101, 110, store device characteristics, store information relating to any devices associated with the first and second users 101, 110, store information associated with the communications network 135, store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

As shown in the diagrams and schematics illustrated in FIGS. 2-14, the system 100 may also include a rotator device 200, which may be a device that may be configured to store one or more vials, tubes, and/or containers in slots of the rotator device 200. Notably, the rotator device 200 may include a plurality of components that work together to provide the operative functionality of the rotator device 200. In particular, the rotator device 200 may include any number and/or combination of the following components: a container 202, a cup 204, one or more vials/tubes 206 for storing samples to be irradiated, an insulating sleeve 208, a stand mount 210, an adjustable-height stand 212, a spout 214, a cover plate 302, a screw 402 (e.g. screw, 8-32×1.5", socket hex), a washer 404 (e.g. washer no. 8 oversized, OD 0.625 SST), a screw 406 (e.g. screw M3×16 MM, SST, hex flat), a switch 408 for detecting when the cup 204 is rotating (e.g. snap-acting switch, subminiature, roller), a cup butt 410 (i.e. base portion of the cup 204, which may be coupled to the driveshaft 432, a screw 412 (e.g. M3×30 MM, phil, pan), a motor shield 414, a grommet 416 (e.g. grommet for 3.5 mm jack), a screw 418 (e.g. screw, M3×6 MM, phil, pan, SST), a locking ring 420, a jack, panel mount, stereo 422 (e.g. 3.5 MM Jack, panel mount, stereo) (the jack 422 may be utilized to connect the rotator device 200 to the radiation device 800), a base cover 424 (e.g. a lead base cover), an O-ring 426 (e.g. O-ring, epdm, ID 4.5", ⅛" CS), an O-ring 428 (e.g. O-ring, epdm, ⅛" CS, 3⅝" ID, 3⅞" OD), a nut 430 (e.g. 8-32 Zinc-plated steel narrow hex nut), a driveshaft 432 (e.g. a bucket driveshaft), a motor shield shield 434 (i.e. a shield for the motor shield 414), a driveshaft collar 436 (mates the driveshaft 432 to the motor 438), a motor 438 (e.g. a motor, 24V DC, 1 RPM), a cable assembly 1002 and a screw 440 (e.g. screw, ¼-20×⅝ hex head zinc steel). In certain embodiments, portions of the rotator device 200 may be configured to receive dry ice 702 and/or other cooling substances (or potentially heating substances). In certain embodiments, the container 202 may be made of a reflective material (e.g. reflective material and technology as provided in U.S. Pat. No. 6,389,099). In certain embodiments, the rotator device 200 may also include a knob 804, which may be configured to turn or adjust so as to move the rotator device 200 up or down when the rotator device 200 is placed on the adjustable-height stand 212 and/or stand mount 210. The rotator device 200 may also include a plug with the cable assembly 1002 and accompanying cord for plugging the rotator device 200 into a power source for providing power to the rotator device 200. In certain embodiments, the rotator device 200 may be connected to a radiation device 200 using the jack 422 and/or the cable assembly 1002, and which may also provide power to the rotator device and may provide a switch signal to a programmable logic controller (and/or processor) of the rotator device 200 and/or radiation device 800. In certain embodiments, the rotator device 200 may include a plurality of screws 1204 for affixing the stand mount 210 to the cover plate 302 and to the remaining portion of the rotator device (e.g. container 202).

Figure 4:
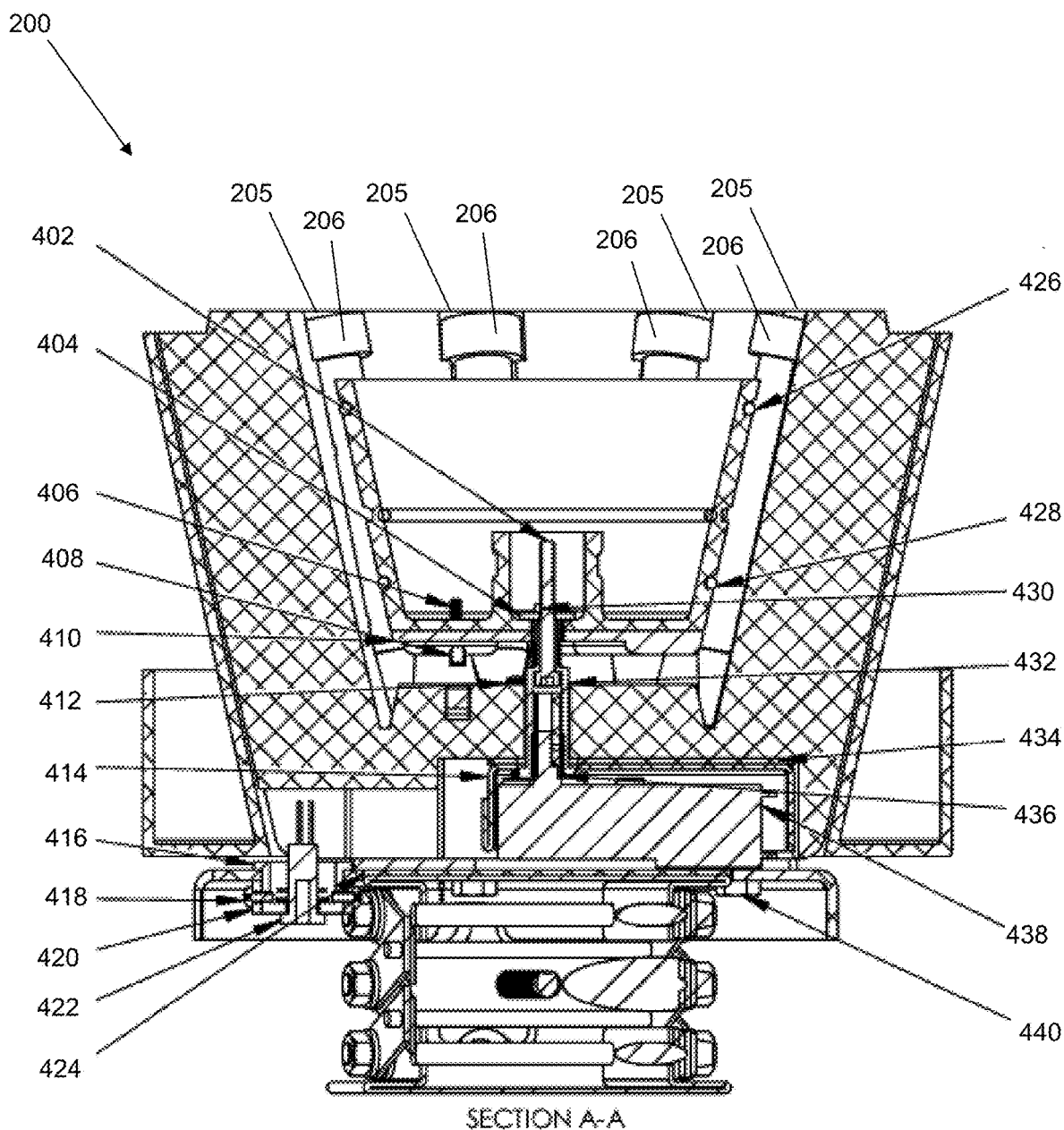
FIG. 4 is a cross-sectional view of the on-axis, angled, rotator for x-ray irradiation of FIG. 3 according to an embodiment of the present disclosure.

In certain embodiments, the container 202 of the rotator device 200 may include one or more slots 205 within which a vial/tube 206 containing a sample may be placed. In certain embodiments, a slot 205 may have a semicircular shape (or any other desired shape) that allows a portion of a vial/tube 206 to reside within the semicircular portion of the slot 205 when the vial/tube 206 is dropped into the slot 205. In certain embodiments, the slot 205 may have any suitable shape, which may be tailored to receive a portion of a vial/tube 206. In certain embodiments, any number of protrusions may be present in each slot 205 so as to reduce rolling friction when a vial/tube 206 is positioned in the slot 205. In a preferred embodiment, each slot 205 may include two protrusions for reducing rolling friction, such as when the vial/tube 206 is rotated using the cup 204. In certain embodiments, the slots 205 may be bored into the container 202 such that the slots 205 have angles such that when the rotator device 200 is placed in (or within range of) the perpendicular irradiation plane 810 of the radiation device 800, the angles of the samples in the vials/tubes 206 in the slots 205 are between 0 and 180 degrees in the perpendicular irradiation plane 810. In certain embodiments and as shown in FIG. 4, the slots 205 may be spaced apart evenly with respect to each other within the circular interior of the container 202. However, in certain embodiments, the slots may be spaced apart at varying distances depending on the situation and/or application.

Figure 5:
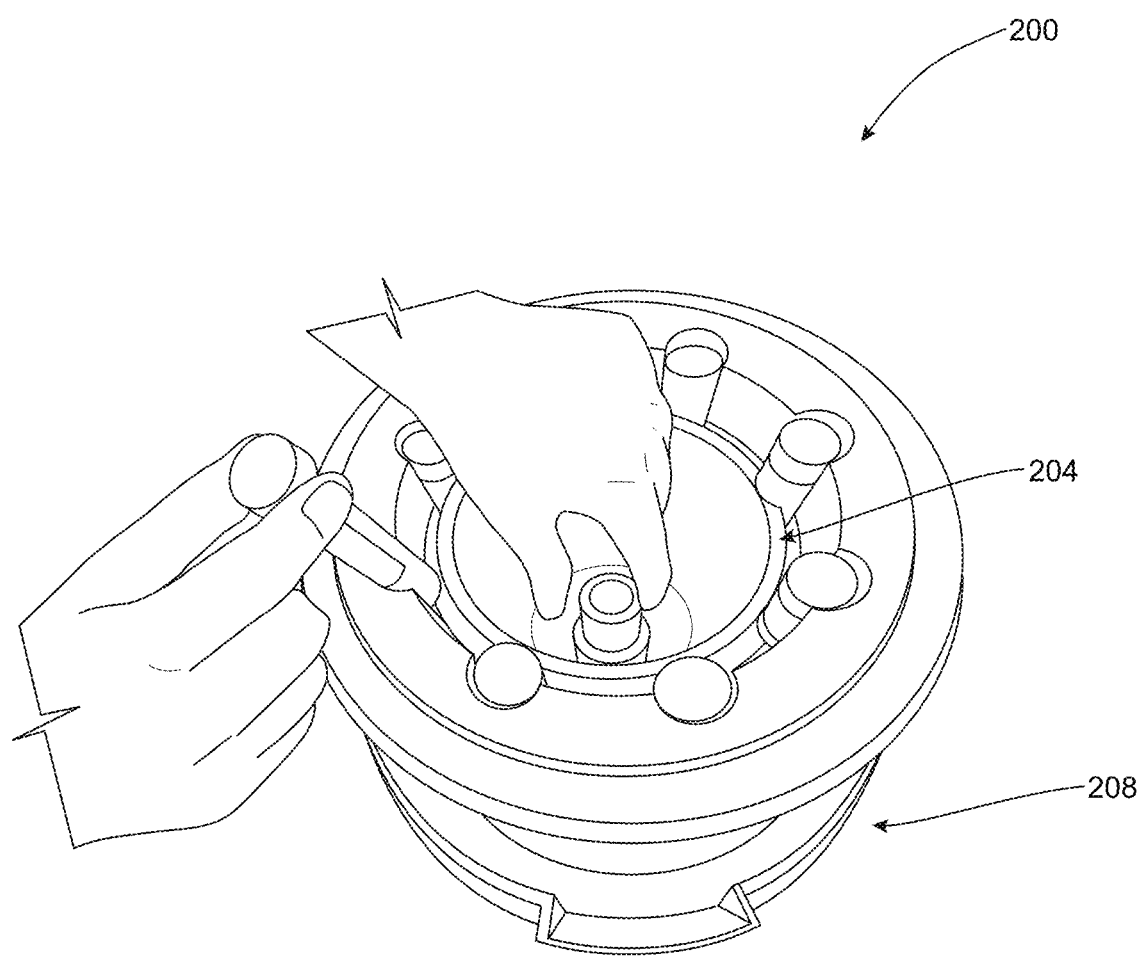
FIG. 5 is a top angled view of an on-axis, angled, rotator for x-ray irradiation where a cup of the rotator is lifted and vials are inserted into the rotator according to an embodiment of the present disclosure.
Figure 6:
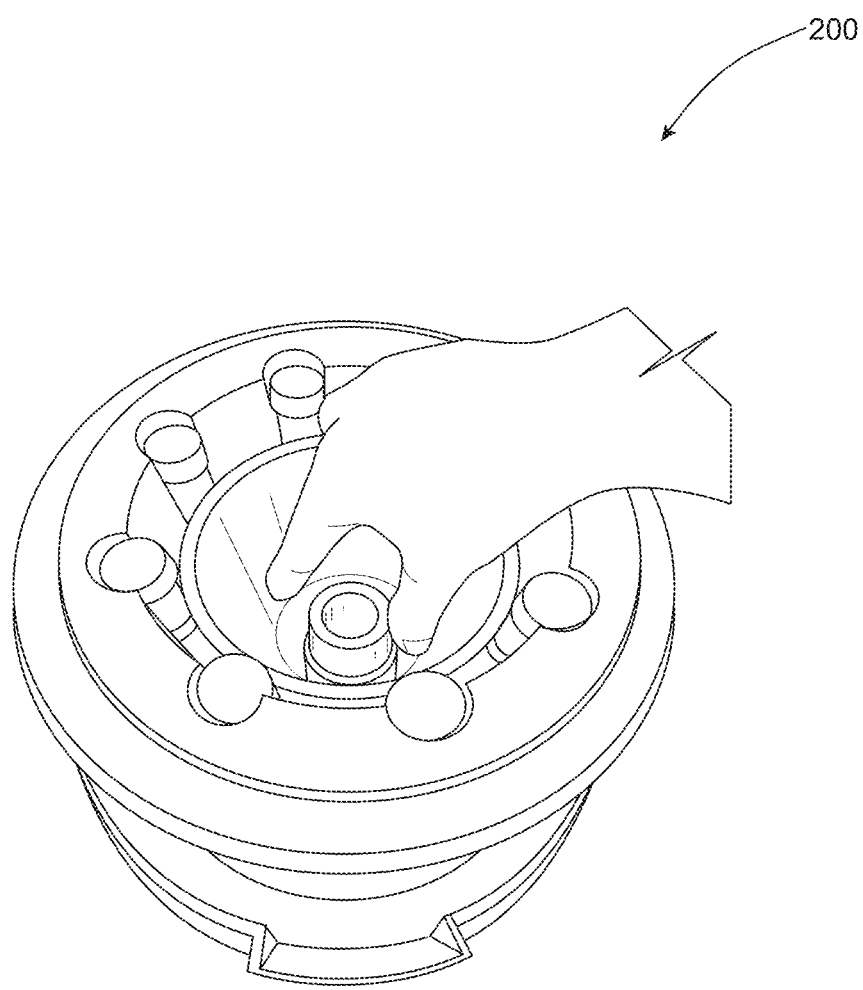
FIG. 6 is a top angled view of an on-axis, angled, rotator for x-ray irradiation where a cup is inserted into the rotator according to an embodiment of the present disclosure.
Figure 7:
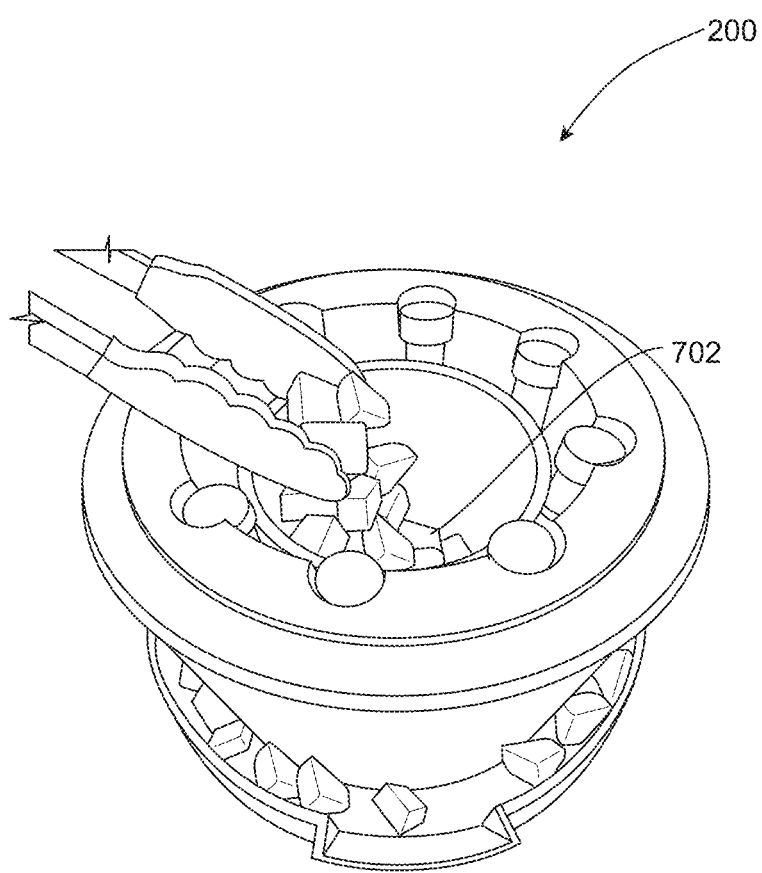
FIG. 7 is a top angled view of an on-axis, angled, rotator for x-ray irradiation where the cup and brim are filled with dry ice according to an embodiment of the present disclosure.
Figure 8:
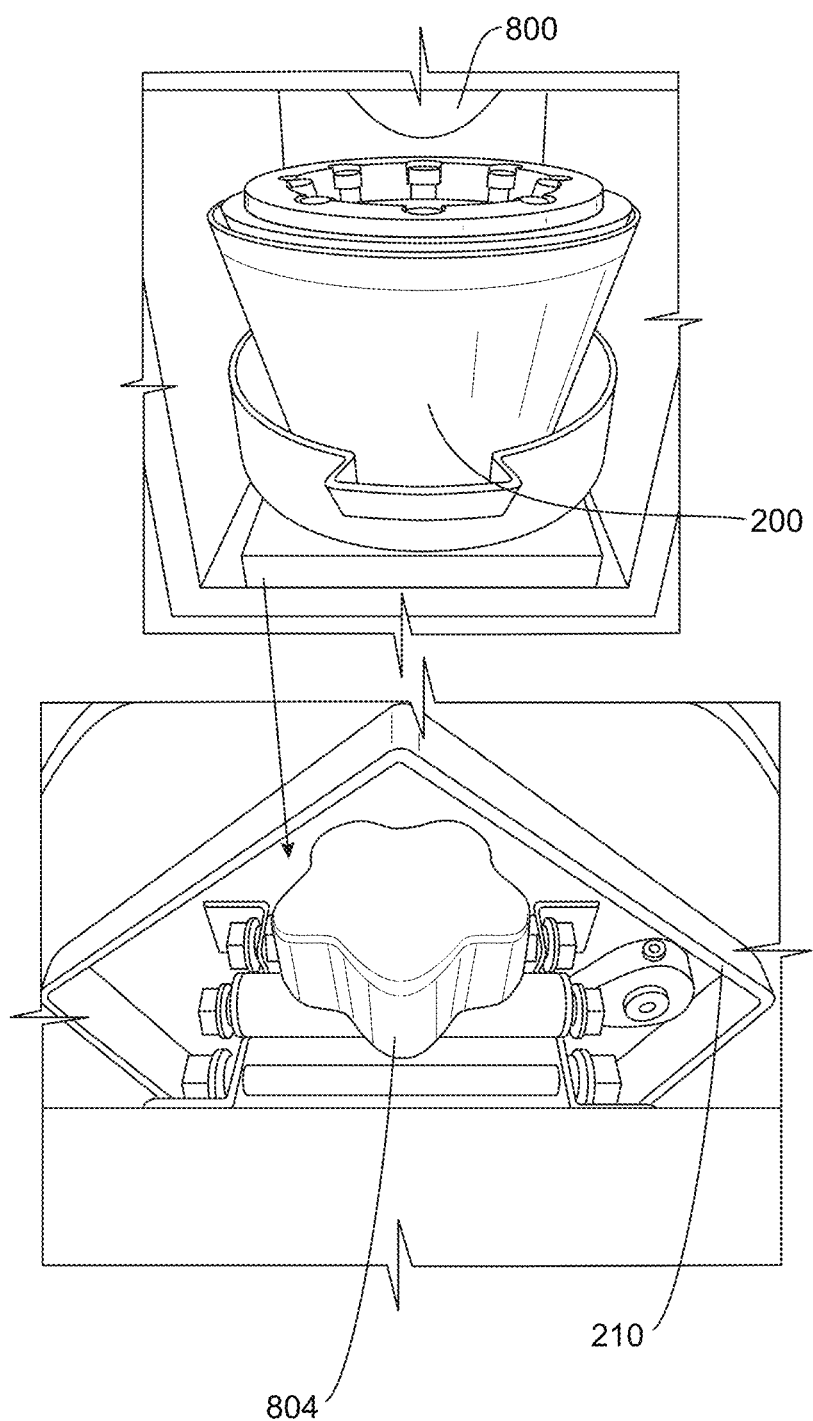
FIG. 8 features side and bottom views of an on-axis, angled, rotator for x-ray irradiation positioned on a stand according to an embodiment of the present disclosure.
Figure 9A:
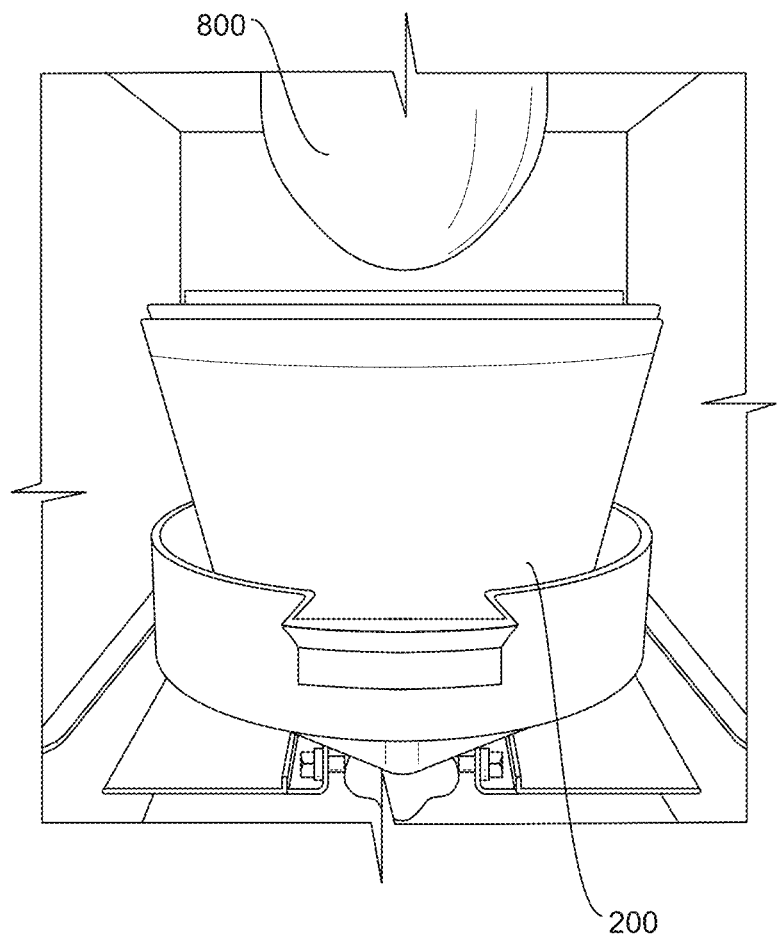
FIG. 9A is a side view of an on-axis, angled, rotator for x-ray irradiation positioned under a x-ray tube radiation device according to an embodiment of the present disclosure.
Figure 9B:
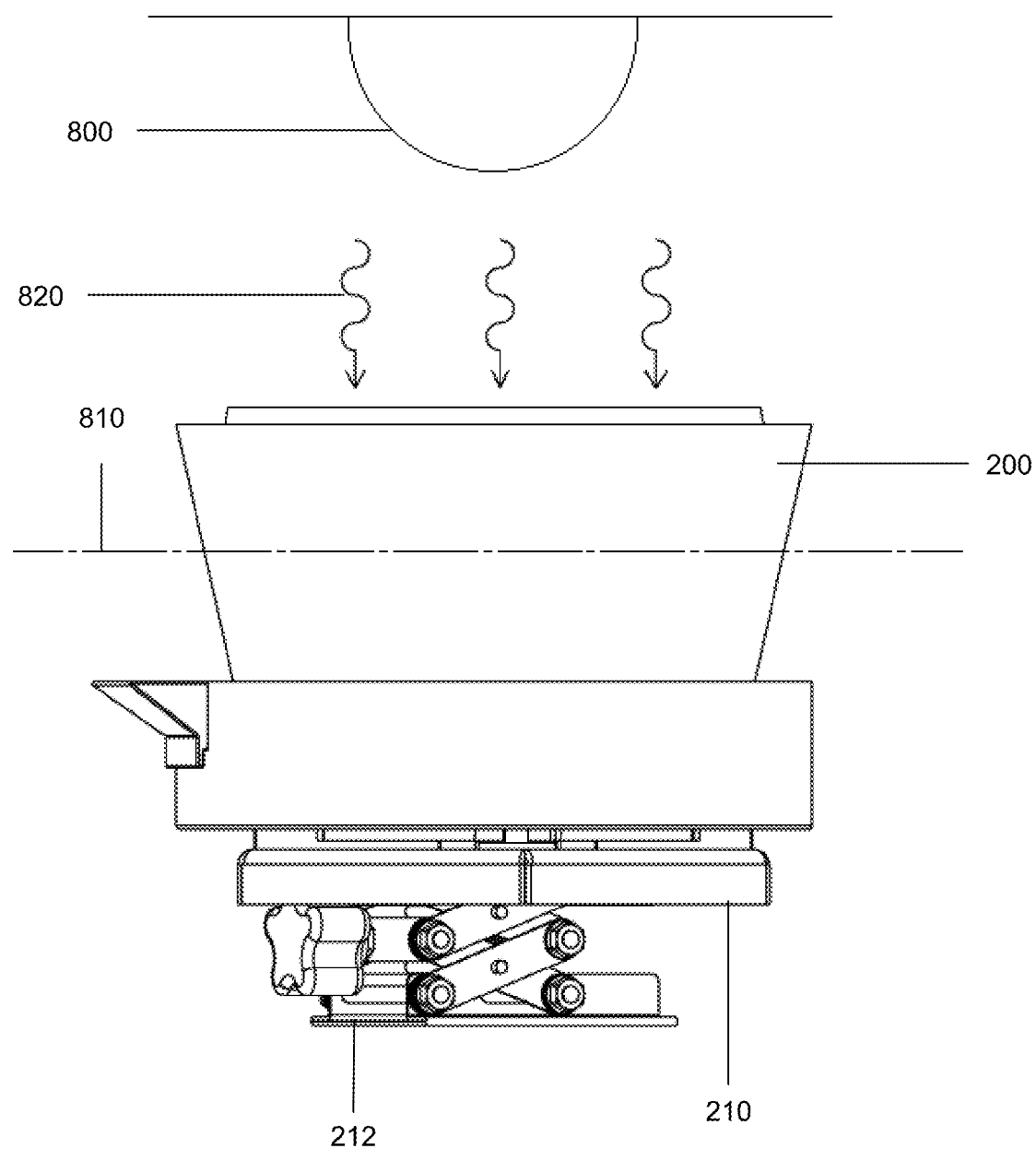
FIG. 9B is a further side view of an on-axis, angled, rotator for x-ray irradiation positioned under a x-ray tube radiation device, which is emitted x-rays, according to an embodiment of the present disclosure.
Figure 10:
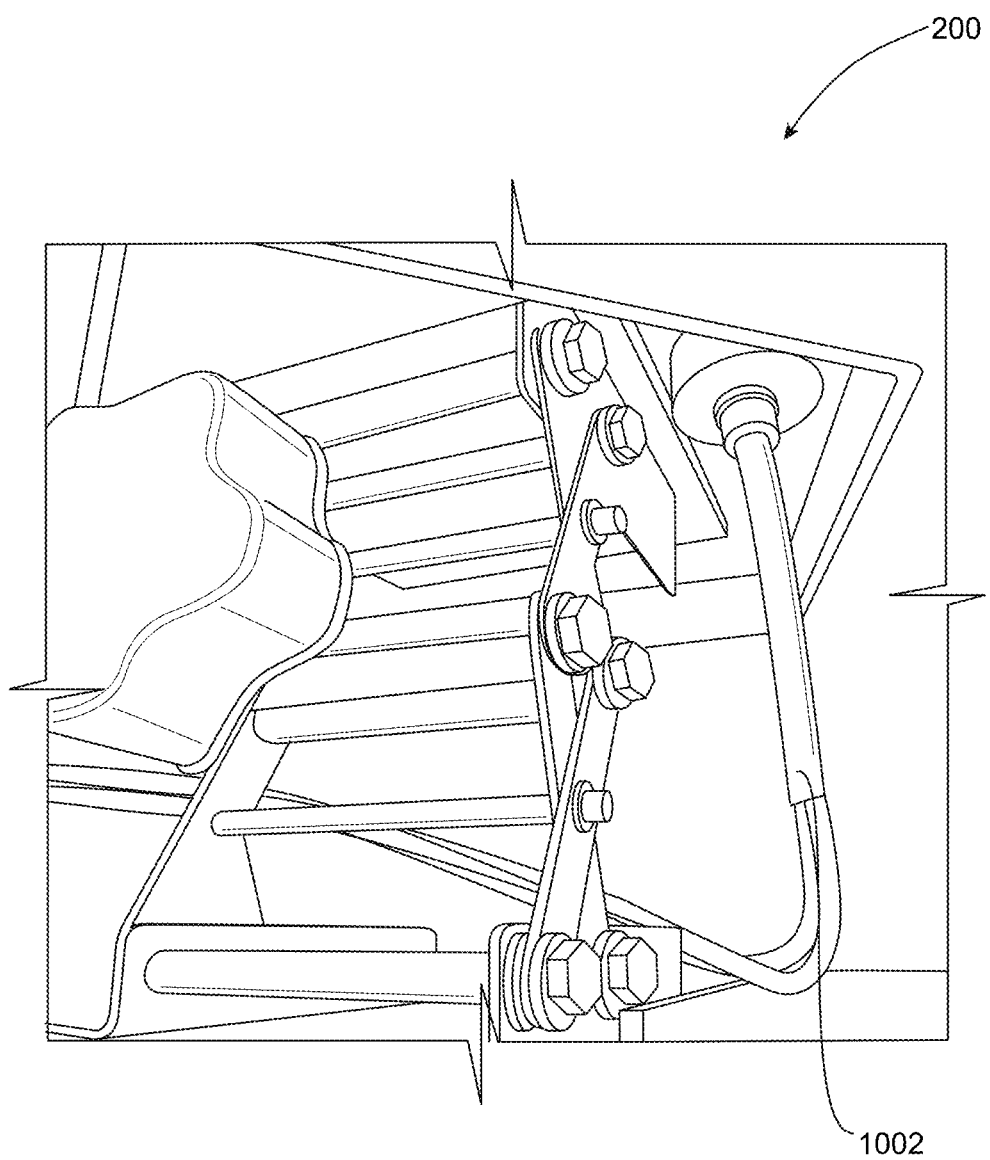
FIG. 10 is a bottom view of an on-axis, angled, rotator for x-ray irradiation illustrating the rotator being plugged-in according to an embodiment of the present disclosure.
Figure 11:
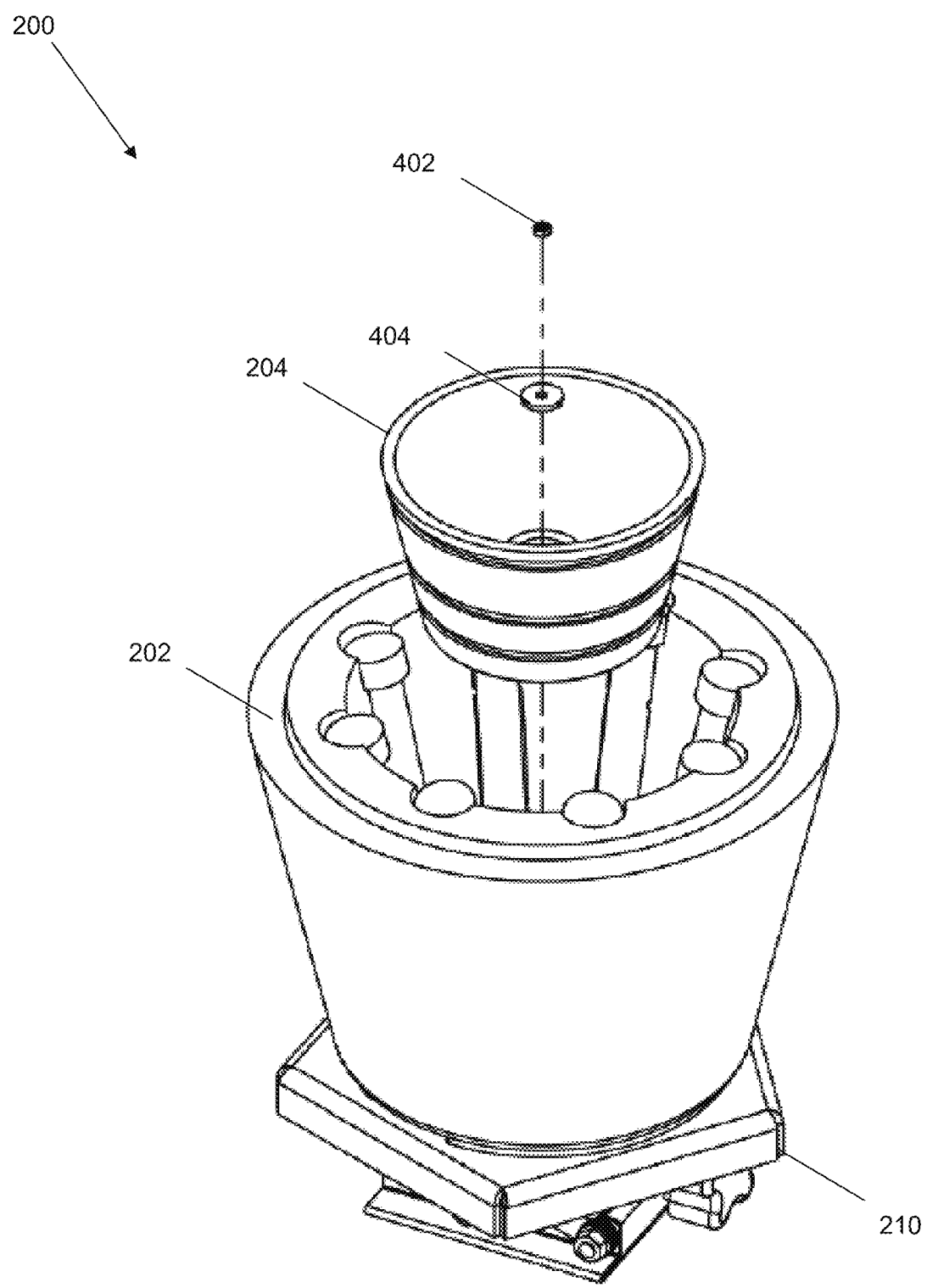
FIG. 11 is a perspective view of an on-axis, angled, rotator for x-ray irradiation depicting replacement of a cup according to an embodiment of the present disclosure.
Figure 12:
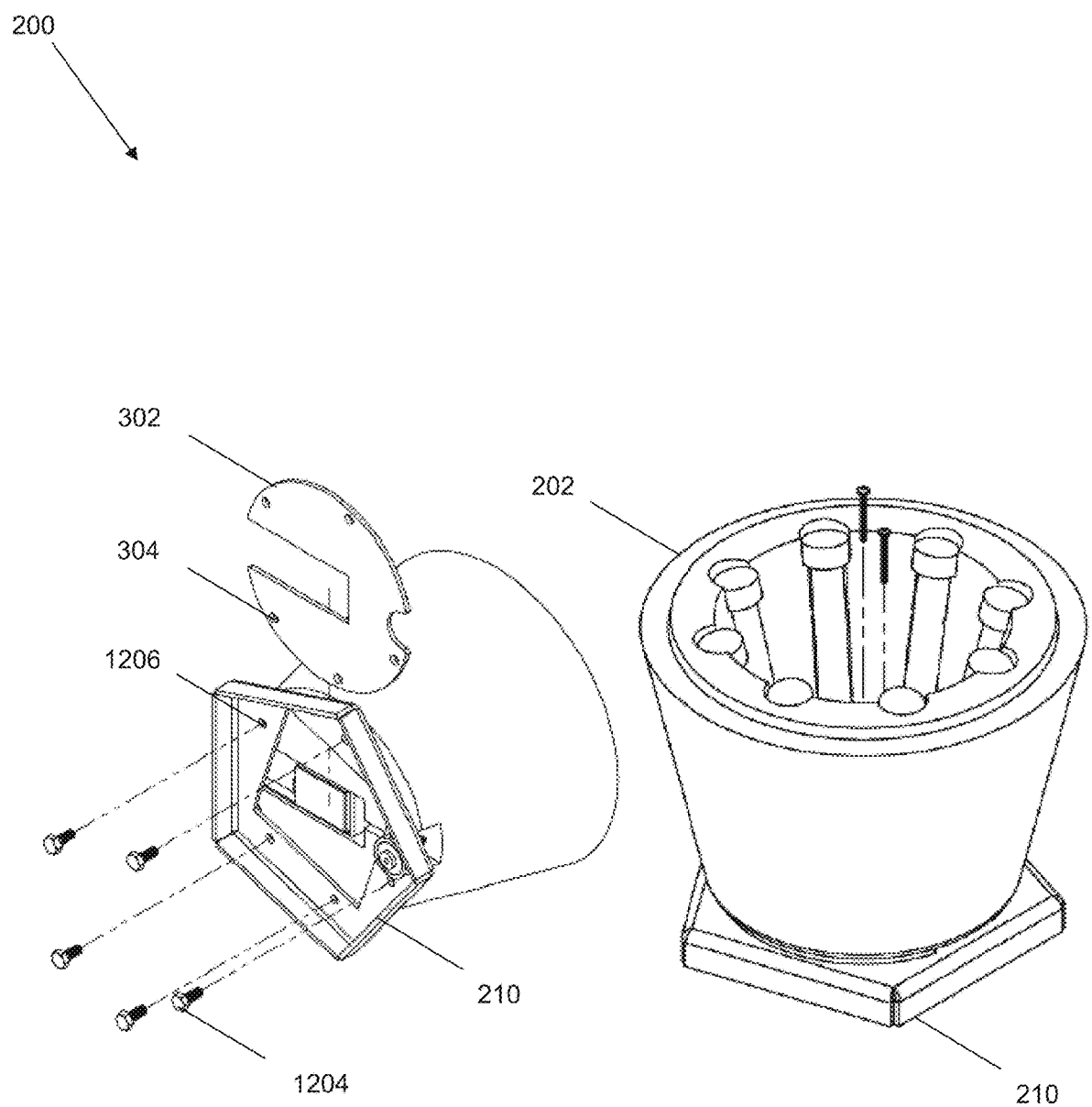
FIG. 12 features an angled top view and a view of the bottom and side of an on-axis, angled, rotator for x-ray irradiation illustrating replacement of a driveshaft of the rotator according to an embodiment of the present disclosure.

In certain embodiments, the cup 204 of the rotator device 200 may be the component of the rotator device 200 that rotates the tubes/vials 206. The cup 204 itself may be dropped into the container 202 and may be attached to the container 202 and to the driveshaft 432 using the screw 402 and washer 404, as is shown in FIG. 11. Similarly, the cup 204 may be removed from the container 202 by removing the screw 402 and washer 404, as shown in FIG. 5. Notably, in certain embodiments, the vials/tubes 206 containing the samples may be dropped into the slots 205 prior to attaching the cup 204 to the rotator device 200. Once the vials/tubes 206 containing the samples are dropped into the slots 205, the cup 204 may then be dropped into and attached to the rotator device 200, as shown in FIG. 6. The outer surface of the cup 204 may contact the vials/tubes 206 via one or more O-rings 426, 428 or other similar components positioned on and/or around the outside surface of the cup 204. The O-rings 426, 428 and/or other similar components may provide enough friction so as to enable the vials/tubes 206 to rotate about a center axis when the cup 204 rotates. In certain embodiments, if the samples need to be temperature regulated, any desired substance at any suitable temperature may be placed and/or poured into the cup 204. For example, as shown in FIG. 7, if the samples need to be chilled, dry ice may be placed (e.g. at desired intervals) inside the opening of the cup 204 (such as via spout 214) so that the temperature of the samples in the vials/tubes 206 may be regulated as desired. In addition to placing the dry ice into the cup 204 itself and as shown in FIG. 7, the dry ice may also be placed within the insulating sleeve 208 that the container 202 may be placed in. Notably, in certain embodiments, the substance put into the opening of the cup 204 and/or the insulating sleeve 208 should not overflow beyond the walls/confines of the cup 204 and/or the insulating sleeve 208. In a preferred embodiment, the substance put into the opening of the cup 204 is filled only halfway up the storage area of the cup 204.

Once the cup 204 is secured to the rotator device 200 and the vials/tubes 206 are positioned in the slots 205, the rotator device 200 may be positioned and secured onto the stand mount 210 of an adjustable-height stand 212. In certain embodiments, the rotator device 200 may be secured to the stand mount 210 using the screws 1204 or other screws described in the present disclosure. In certain embodiments, a cover plate 302 may reside between the stand mount 210 of the adjustable-height stand 212 and the base of the rotator device 200. In certain embodiments, the cover plate 302, the base of the rotator device 200, and the stand mount 210 may include one or more bored holes 1206 for receiving the screws 1204, and the cover plate 302 may be placed over stand mount 210 such that the holes 304 of the cover plate 302 and the stand mount 210 are aligned with each other. The screws 1204 may then be inserted into the holes 1206 of the stand mount 210 and the cover plate 302 when the holes 1206, 304, 470 of the stand mount 210, the cover plate 302, and the base of the rotator device 200 are aligned. Once the screws 1204 are inserted, the screws 1204 may be tightened as necessary to secure the cover plate 302, the stand mount 210, and the base of the rotator device 200 together. Once the stand mount 210 is secured to the adjustable-height stand 212 and the rotator device 200, the knob 804 may be turned in a clockwise direction so as to cause the adjustable-height stand 212 to expand and raise the rotator device 200 upwards. For example, when the rotator device 200 is secured to the adjustable-height stand 212 and vials/tubes 206 with samples are present in the slots 205, the knob 804 may be turned to cause the adjustable-height stand 212 to raise the rotator device 200 closer towards a radiation field (e.g. field including photons 820) emitted by a radiation device 800 (e.g. an x-ray tube or other radiation device). In certain embodiments, the knob 804 may be turned in a counter-clockwise direction to cause the adjustable-height stand 212 to contract and thereby lower the rotator device 200 downwards. Once the desired height is reached for the adjustable-height stand 212, a user can simply stop turning the knob 804.

Figure 13:
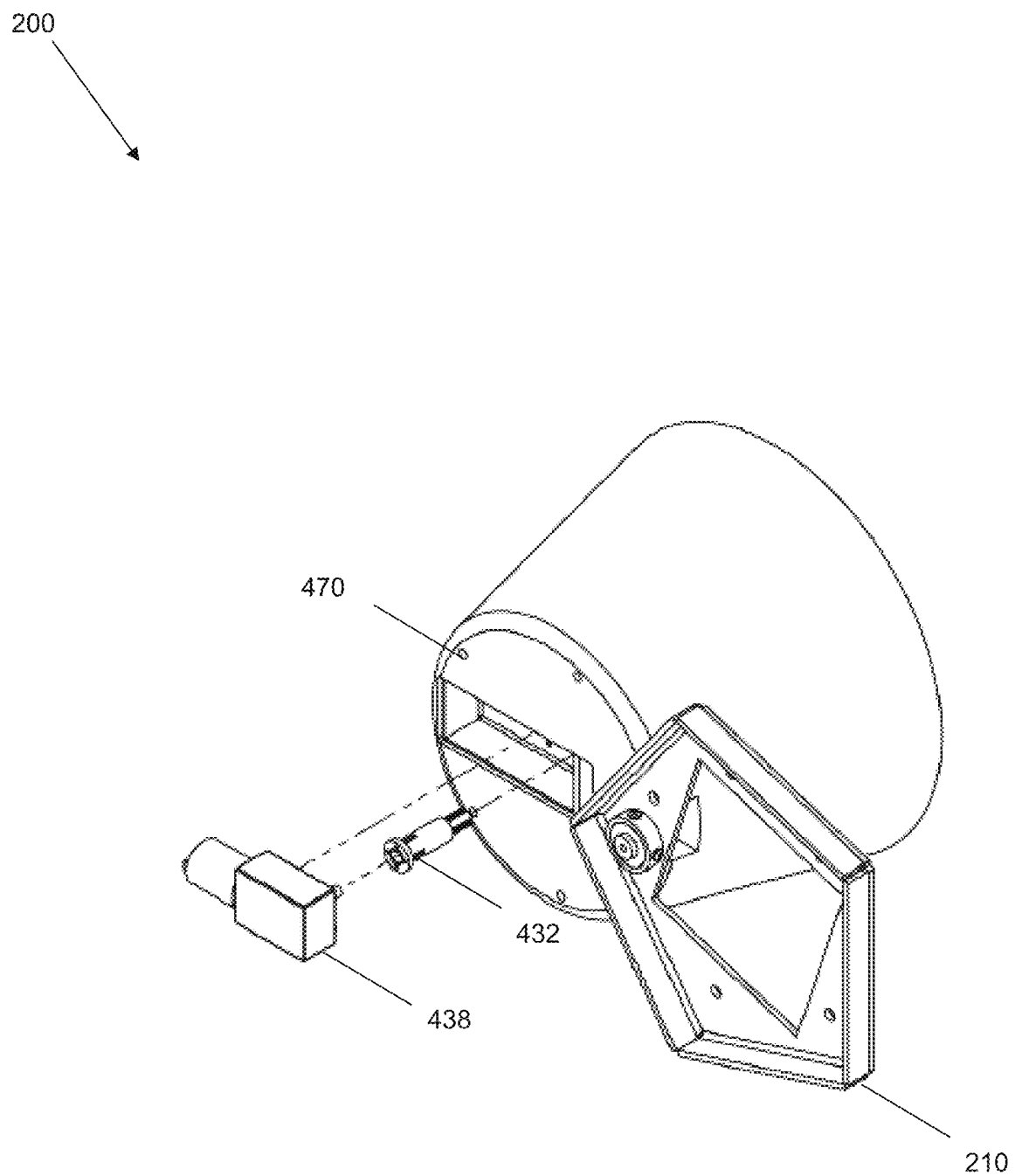
FIG. 13 features another view of the bottom and side of an on-axis, angled, rotator for x-ray irradiation illustrating removal of a motor and replacement of a driveshaft of the rotator according to an embodiment of the present disclosure.

In certain embodiments, the rotator device 200 may include any number of motors, such as motor 438, for powering the rotator device 200. In certain embodiments, the motor 438 of the rotator device 200, when activated, may be configured to generate torque, which may be transmitted to the driveshaft 432 that is connected to the motor 438 using the driveshaft collar 436. The torque transmitted to the driveshaft 138 may be transmitted from the driveshaft 138 to the cup 204 so as to cause the cup 204 to rotate. The rotating cup 204 may then cause any vials/tubes 206 present in the slots to rotate based on friction facilitated by the O-rings 426, 428, which may be in contact with the vials/tubes 206. In certain embodiments, the motor 438 may be protected and shielded by utilizing a motor shield 414 and the motor shield 414 may be protected by utilizing a motor shield shield 434. In the event the motor 438 and/or driveshaft 432 need to be replaced, a user may detach the stand mount 210 from the base of the rotator device 200 and may remove each of these components as necessary, as is shown in FIG. 13. In certain embodiments, the driveshaft 432 may also be configured to enable the cup 204 to slide up and down for loading and/or unloading the cup 204 from the container 202 of the rotator device 200. In certain embodiments, the driveshaft 432 may also be configured to enable the cup 204 to fall down when it shrinks from cooling, keeping contact with the vials/tubes 206.

In still further embodiments, the rotator device 200 may include any number of processors, memories, storage compartments, storage devices, transceivers, any other component, or a combination thereof. For example, the rotator device 200 may include a memory that stores instructions for operating the various functional features of the rotator device 200. The processor, which may be a combination of software, hardware, or both, may be configured to execute the instructions from the memory to perform various operations of the rotator device 200. For example, the processor may execute the instructions to cause the motor 438 to activate and provide torque to the driveshaft 432 so that the drive shaft 432 can rotate the cup 204 of the rotator device 200. The rotator device 200 may include any number of transceivers, which may be configured to enable the rotator device 200 to communicate with the first user device 102, the second user device 111, the servers 140, 150, 160, any other device of the system 100, or a combination thereof. In certain embodiments, the first user device 102, the second user device 111, and/or other devices of the system 100 may not only communicate with the rotator device 200, but also transmit signals to control the rotator device 200. For example, the first user 101 may control the rotator device 200 by inputting commands via a software application executing on the first user device 102 that communicatively links with the rotator device 200.

Figure 14:
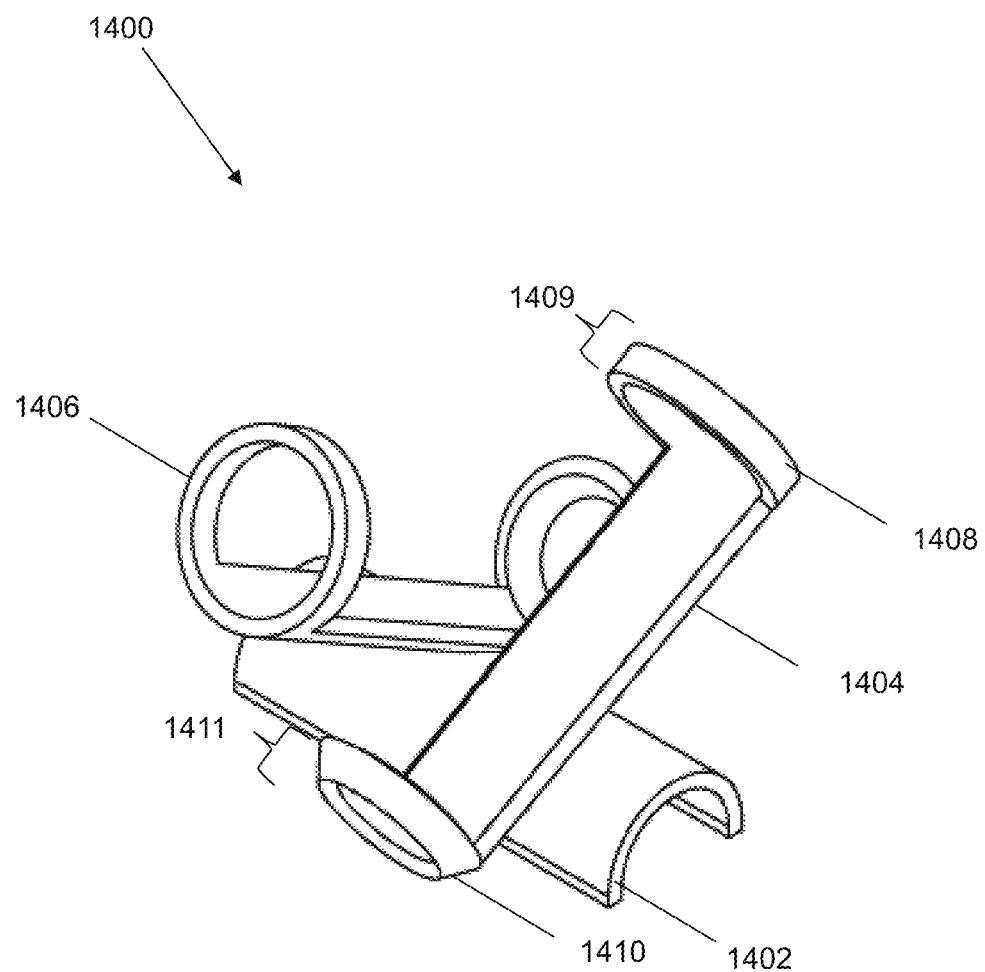
FIG. 14 illustrates a pair of opposing vial/tube holders for use with a device to be positioned in range of opposing radiation devices according to an embodiment of the present disclosure.
Figure 15:
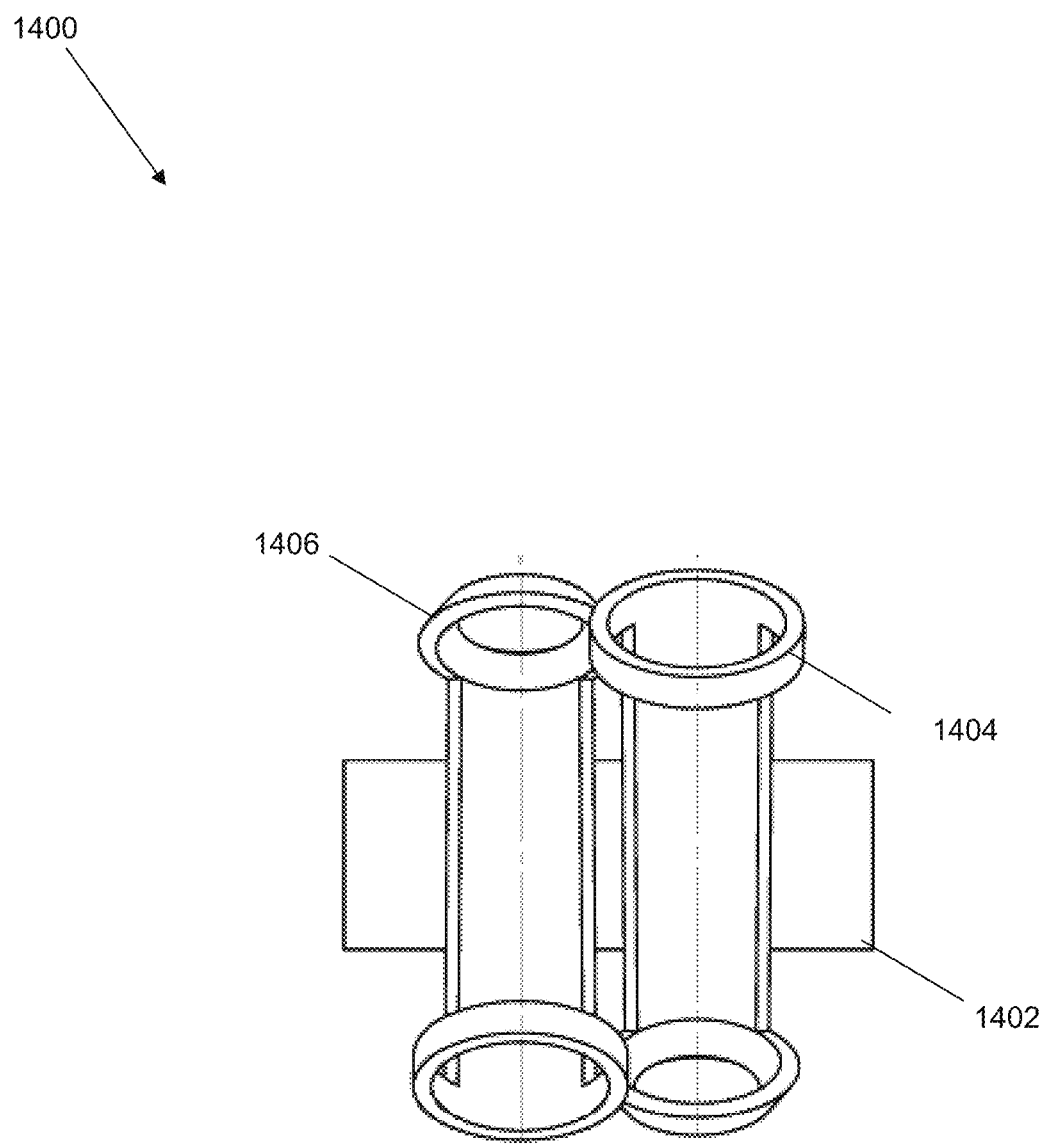
FIG. 15 illustrates a top view of the vial/tube holders of FIG. 14 according to an embodiment of the present disclosure.
Figure 16:
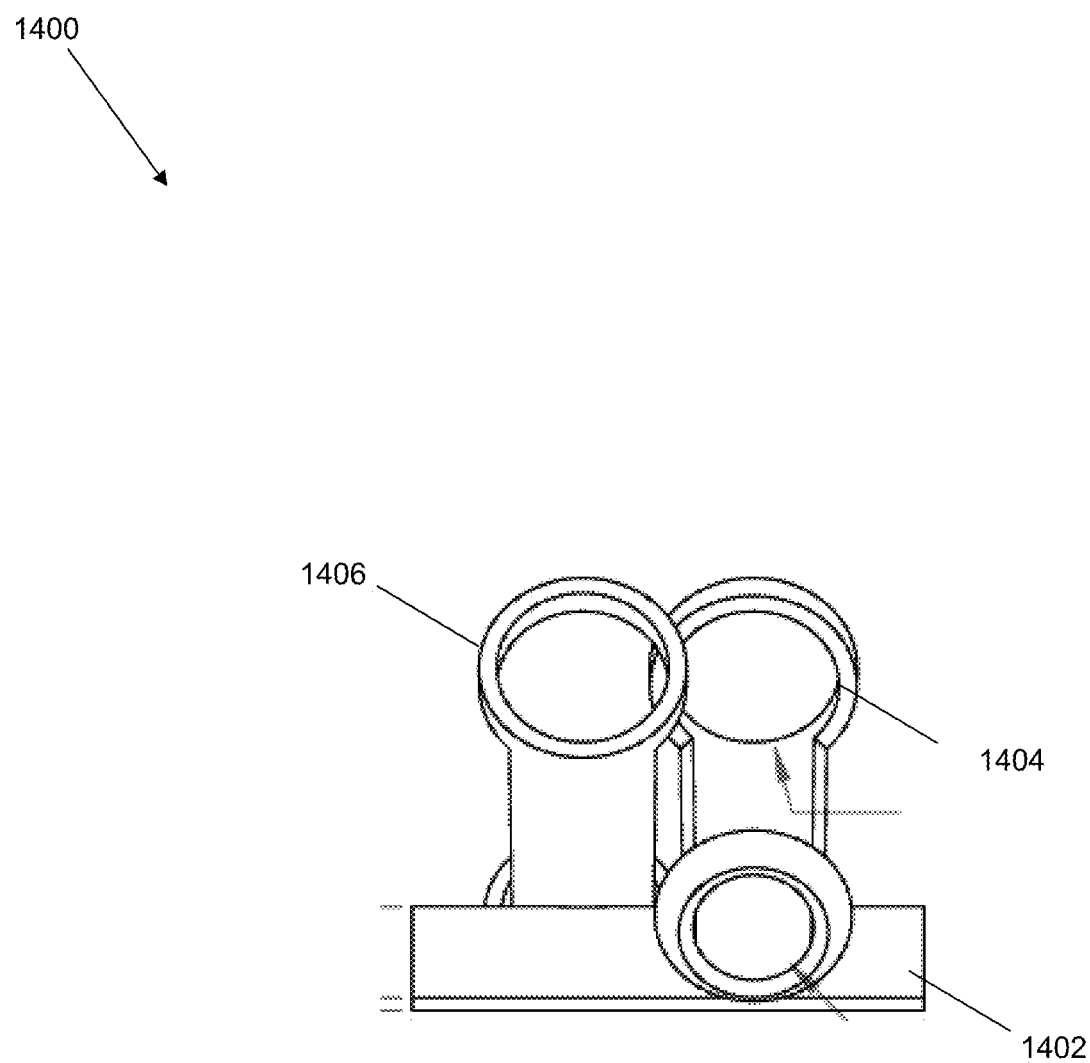
FIG. 16 illustrates a front view of the vial/tube holders of FIG. 14 according to an embodiment of the present disclosure.
Figure 17:
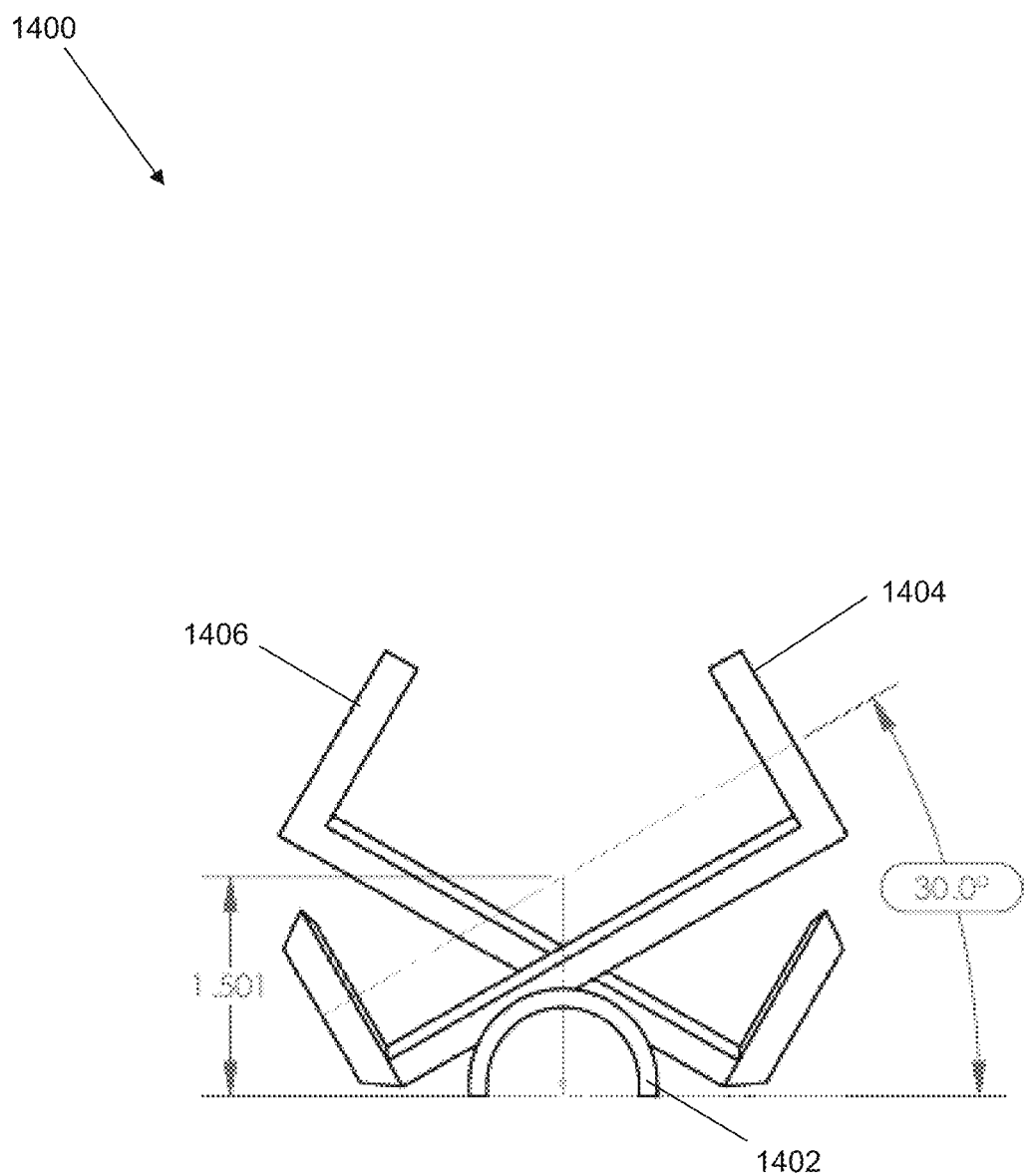
FIG. 17 illustrates a side view of the vial/tube holders of FIG. 14 according to an embodiment of the present disclosure.
Figure 18:
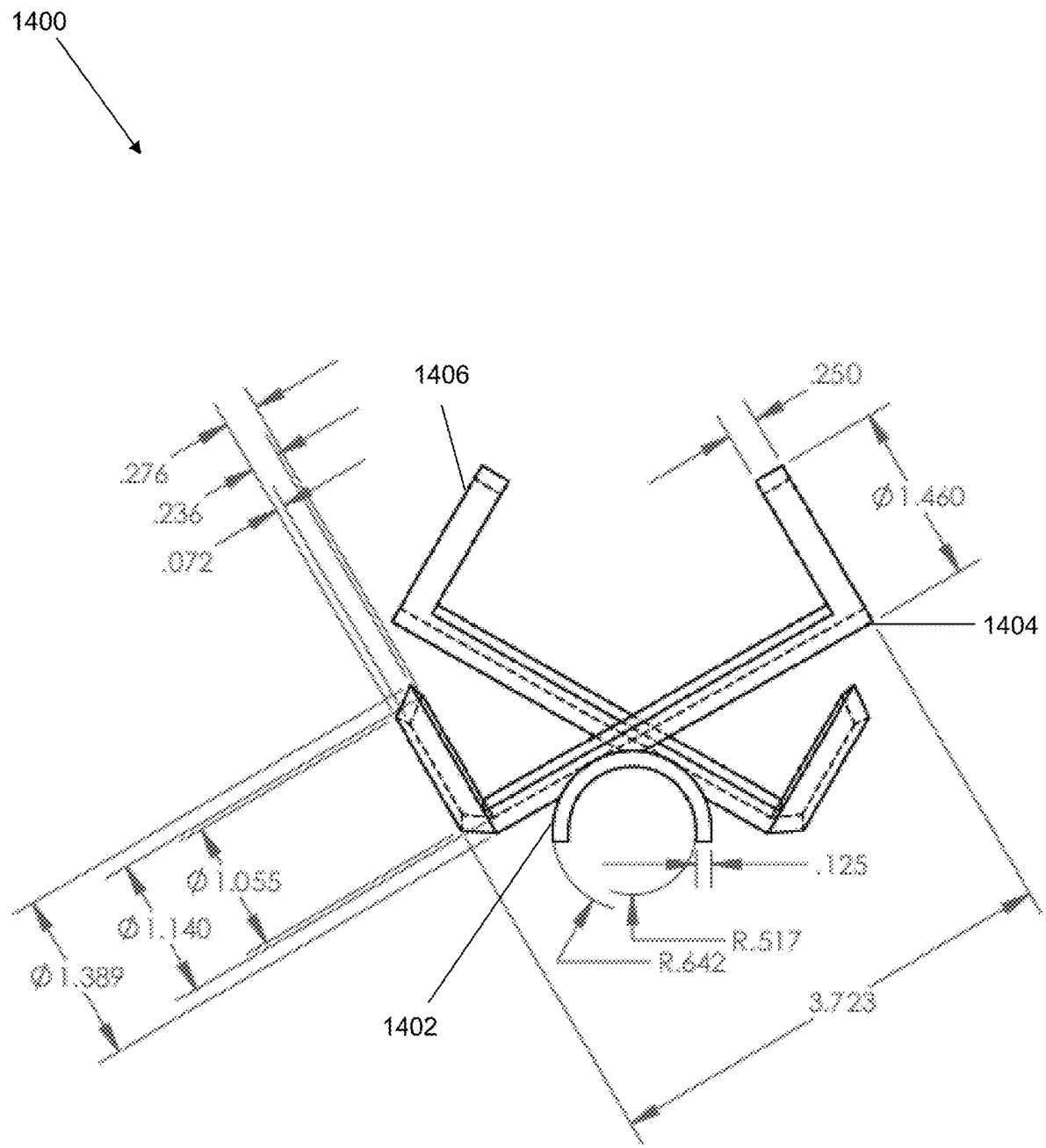
FIG. 18 illustrates a side view of the vial/tube holders of FIG. 14 featuring possible measurements of dimensions of the vial/tube holders according to an embodiment of the present disclosure.
Figure 19:
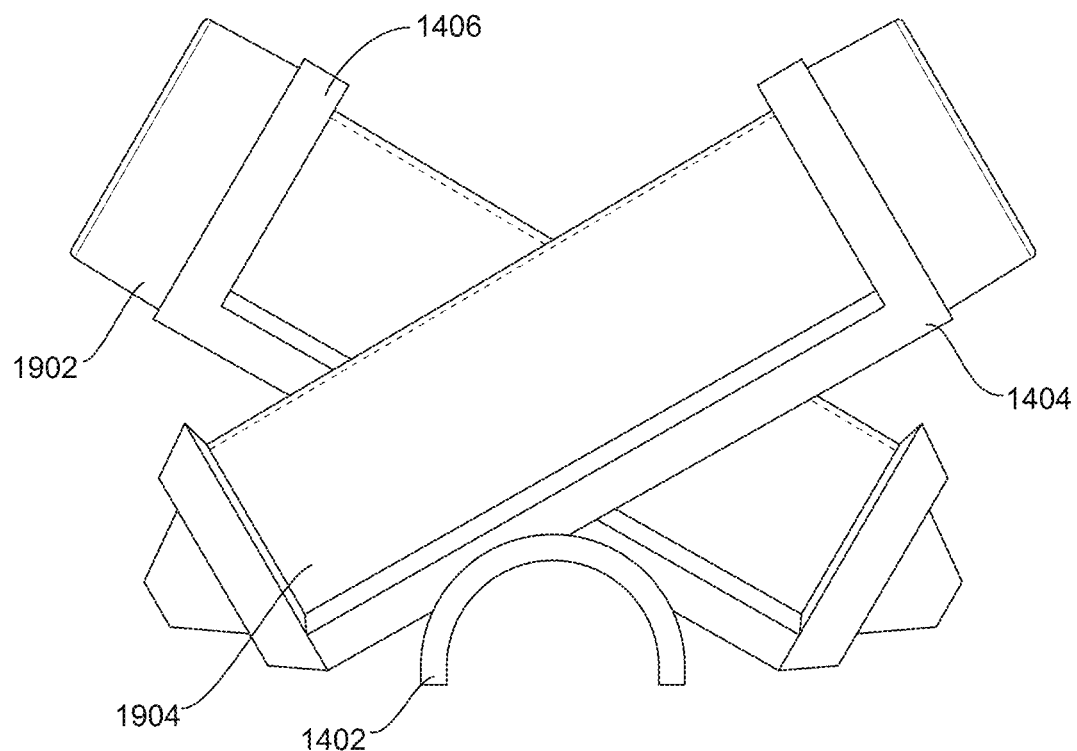
FIG. 19 illustrates a side view of the vial/tube holders of FIG. 14 with vials/tubes inserted into the vial/tube holders according to an embodiment of the present disclosure.

In addition to the embodiments described above and elsewhere in the present disclosure, the system 100 may also include further embodiments. For example, FIGS. 14-20 illustrate an opposing tube configuration, which may be utilized as an alternative to the rotating tube embodiments or in addition to the rotating tube embodiments described herein. The dual tube holder 1400 may be configured to having a first tube holder 1404 and a second tube holder 1406, which may be mounted or otherwise affixed to a mounting portion 1402. In certain embodiments, the first and second tube holders 1404, 1406 may be positioned in proximity to each other and the direction of the first tube holder 1404 may oppose the direction of the second tube holder 1406. For example, in FIGS. 14-20, the first and second tube holders 1404, 1406 are positioned in proximity to each other, but face in opposing directions and are positioned at desired angles with respect to each other and the mounting portion 1402 (e.g. as shown in FIG. 17, one end of the first tube holder 1404 is positioned roughly 30 degrees above a plane at the bottom of the mounting portion 1402 on one side of the mounting portion 1402, and one end of the second tube holder 1406 is positioned roughly 30 degrees above the plane at the bottom of the mounting portion 1402 on the other side of the mounting portion 1402). In certain embodiments, the first tube holder 1404 and the second tube holder 1406 may be configured to have bored out circular ends. For example, as is shown in FIG. 14, a first end 1408 of the first tube holder 1404 may have a circular end which has a width 1409 that is uniform. The bore of the first end 1408 may be circular (or any other desired shape) and the diameter of the bore may be uniform for the entirety of the wide 1409. The first end 1408 may be configured to receive a first end of a vial/tube 206. The second end 1410 of the first tube holder 1404 may also have a width 1411. However, in contrast with the first end 1408, the circular bore of the second end 1408 may gradually decrease in diameter from one end of the second end 1408 to the other end of the second end 1408 (FIG. 14 shows the tapered width 1411 portion, which allows for the gradually decreasing diameter of the bore of the second end 1408. The second end 1408 may have the gradually decreasing diameter so that when a vial/tube 206 is inserted through the first end 1408 the vial/tube 206 will not fall out of the first tube holder 1404 when the vial/tube 206 is fully inserted into the first tube holder 1404 (the diameter of the bore at the end of the second end 1410 may be less than the diameter of at least a portion of the vial/tube 206, for example, e.g. FIGS. 20-21). In certain embodiments, the portion of the first tube holder 1404 (and the second tube holder 1406) in between the circular ends of the first tube holder 1404 may be carved out so that when a vial/tube 206 is positioned in the first and/or second tube holders 1404, 1406, the vial/tube 206 contents may be readily observed.

Figure 20:
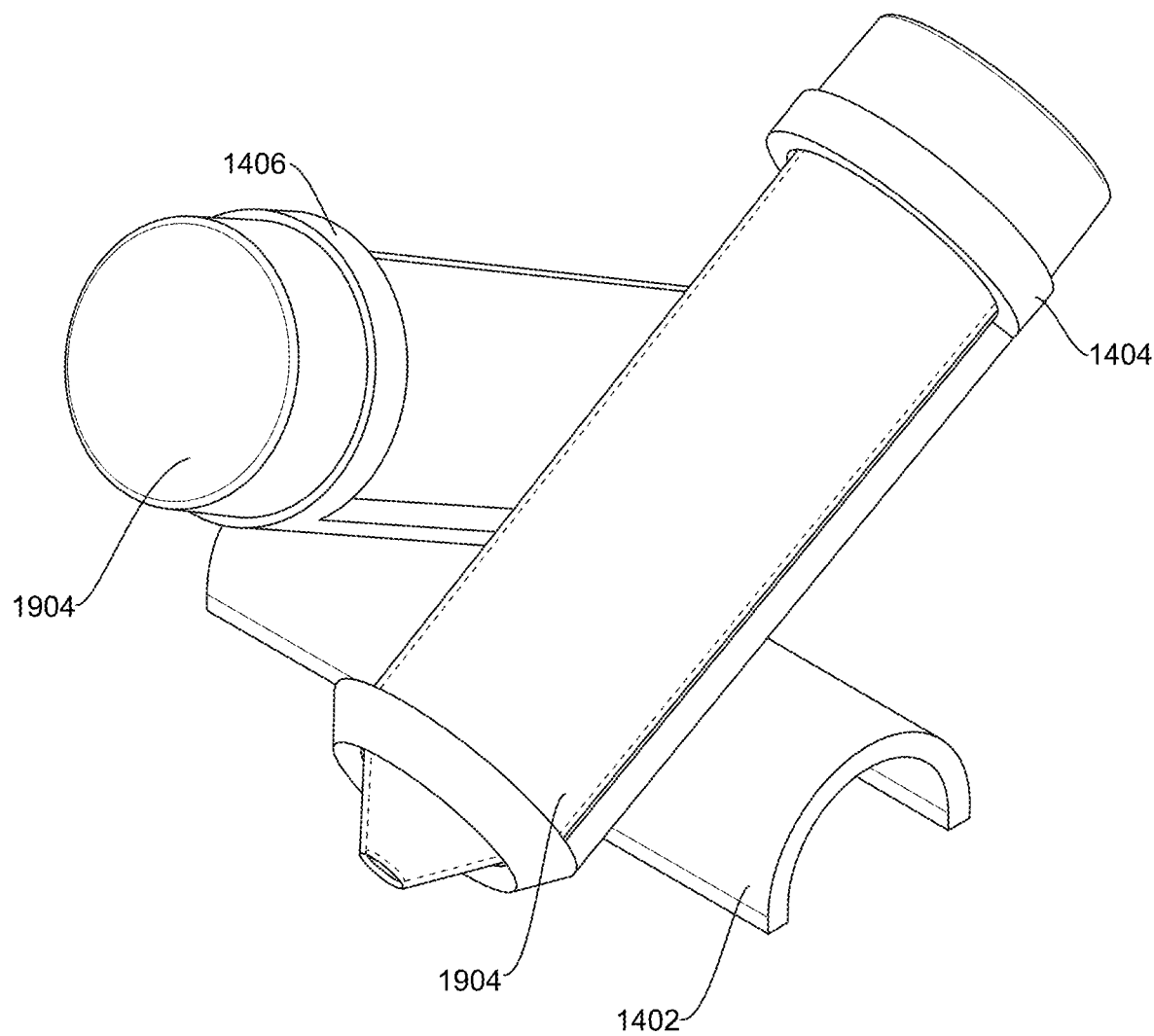
FIG. 20 illustrates an angled front view of the vial/tube holders of FIG. 14 with vials/tubes inserted into the vial/tube holders according to an embodiment of the present disclosure.
Figure 21:
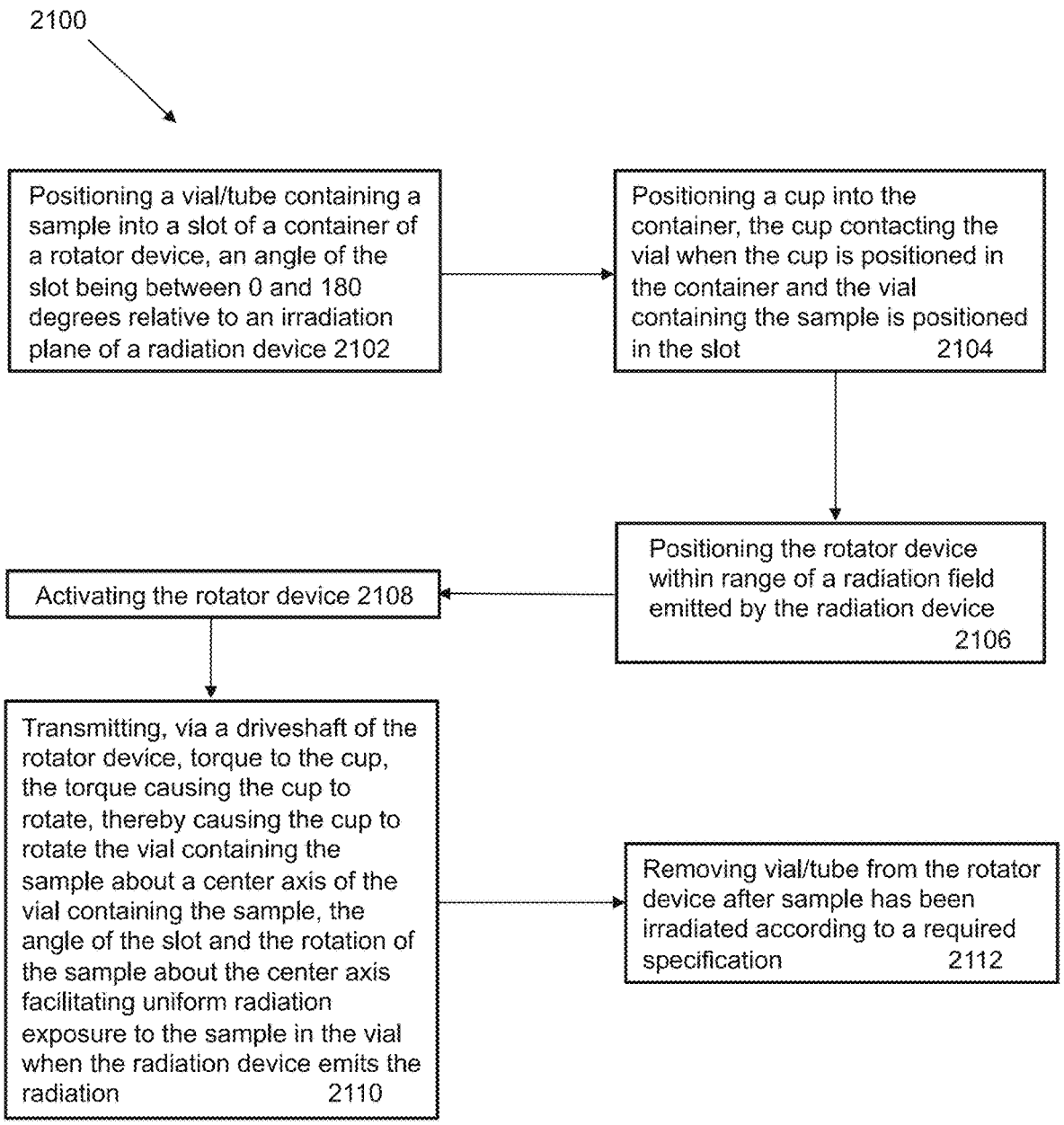
FIG. 21 is a flow diagram illustrating a sample method for using an on-axis, angled, rotator for x-ray irradiation according to an embodiment of the present disclosure.

As is shown in FIGS. 20-21, a pair of vials/tubes 206 may be positioned into the first and second tube holders 1404, 1406 respectively. Each of the vials/tubes 206 may have caps 1902 and tube bodies 1904 as well. The cap 1902 may be removable from the tube body 1904 so that a sample may be inserted into the tube body 1904. Once the sample is contained in the tube body 1904, the cap 1902 may be re-secured to the tube body 1904. In certain embodiments, the tube body 1904 may be configured to be transparent, opaque, and/or be configured to have any desired transparency for visibility of a sample. In certain embodiments, the dual tube holder 1400 may be configured to be positioned within the container 202, however, in other embodiments, the dual tube holder 1400 may be positioned into a different container or other device other than the rotating device 200. For example, instead of positioning the dual tube holder 1400 into the container 202 of the rotating device 200, an entirely different container without slots 205 may be used with the rotating device 200, such as a cooler or other device to control temperature. The different container may have components (e.g. fastening mechanisms for latching into the mounting portion 1402, receptacles for receiving the mounting portion 1402, and/or other components) that may enable the mounting portion 1402 of the dual tube holder 1400 to be secured to the different container. The rotating device 200 may then be positioned in range of the radiation device 800, which may then emit a radiation field to irradiate samples positioned in the opposing tubes of the dual tube holder 1400. In certain embodiments, the dual tube holder 1400 may be positioned in range of a pair of opposing (or other multiple) radiation devices 800, which may emit separate radiation fields to irradiate the samples positioned in the opposing tubes of the dual tube holder 1400. Notably, in further embodiments, the tube holder 1400 is not limited to being a dual tube holder. The tube holder 1400 may have any number of tube holders, which may be oriented in any desired direction.

Operatively, the system 100 may operate and/or execute the functionality as described in the methods of the present disclosure and in the following use case scenarios. According to an exemplary case scenario, the first user 101 may desire to irradiate a plurality of samples. In order to do so, the first user 101 may insert the samples into a plurality of vials/tubes 206. The first user 101 may then position the vials/tubes 206 containing the samples into the angled slots 205 (e.g. slots angled between 0 and 180 degrees relative to the perpendicular irradiation plane 810 of a radiation device 800) of the rotator device 200. The first user 101 may then position and secure the cup 204 including the O-rings 426, 428 to the container 202 of the rotating device 200 and to the driveshaft 432. The first user 101 may then activate the rotator device 200, which may cause the motor 438 to generate torque, which may be transmitted to the driveshaft 432. The torque transmitted to the driveshaft 432 may then be transmitted to the attached cup 204, which may cause the cup 204 to rotate. The rotating cup 204 may cause the vials/tubes 206 positioned in the angled slots 205 to rotate about their center axes via the O-rings 426, 428 secured to the outer surface of the cup 204. The angled slots 205 and the rotating of the samples about the center axes may facilitate uniform radiation exposure to the samples contained in the vials/tubes present in the angled slots 205 when the rotating device 200 is positioned within range of a radiation field of a radiation device 800. As another use case scenario, the first user 101 may desire to irradiate samples using the dual tube holder 1400 instead. In such a scenario, the first user 101 may simply position vials/tubes 206 containing samples into each of the tube holders of the dual tube holder 1400 and position the dual tube holder 1400 into the container 202 of the rotating device 200 or into another container. The first user 101 may then position the samples contained in the dual tube holder 1400 within range of a radiation device 800 so as to irradiate the samples.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, activating and/or deactivating the rotator device 200; activating and/or deactivating the radiation device 200; facilitating positioning of a vial/tube containing a sample to be irradiated into a slot of the rotator device 200; facilitating positioning of a cup into a container of the rotator device 200; facilitating positioning of the rotator device 200 within range of a radiation field emitted by a radiation device 800; facilitating transmission of torque to the cup of the rotator device 200, such as via a driveshaft of the rotator device 200; facilitating rotating of the cup to rotate the vials/tubes in the slots; facilitating uniform radiation exposure to the samples in the vials/tubes; removing the vials/tubes from the rotator device 200 after the samples have been irradiated according to desired requirements; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIGS. 1-20 illustrates specific example configurations of the various components of the system 100, the system 100 may include any configuration of the components, which may include using a greater or lesser number of the components. For example, the system 100 is illustratively shown as including a first user device 102, a second user device 111, a radiation device 800, a rotator device 200, vials/tubes 206, a communications network 135, a server 140, a server 145, a server 150, a server 160, and a database 155. However, the system 100 may include multiple first user devices 102, multiple second user devices 111, multiple radiation devices 800, multiple rotator devices 200, any number of vials/tubes 206, multiple communications networks 135, multiple servers 140, multiple servers 145, multiple servers 150, multiple servers 160, multiple databases 155, or any number of any of the other components inside or outside the system 100. Furthermore, in certain embodiments, substantial portions of the functionality and operations of the system 100 may be performed by other networks and systems that may be connected to system 100.

Notably, the system 100 may execute and/or conduct the functionality as described in the method(s) that follow. As shown in FIG. 21, an exemplary method 2100 for utilizing an on-axis, angled, rotating device for x-ray irradiation is schematically illustrated. The method 2100 may include steps for utilizing a unique rotator device 200 to facilitate more effective dosage rates and uniform radiation exposure for samples being stored in the rotator device 200. At step 2102, the method 2100 may include positioning a vial/tube containing a sample to be irradiated into a slot of a container of the rotator device 200. In certain embodiments, the angle of the slot may be configured to be between 0 and 180 degrees relative to the perpendicular plane of a radiation device 800 configured to emit radiation towards the rotating device 200 and sample. In certain embodiments, the positioning of the vial/tube may be performed and/or facilitated by the first user 101, the second user 110 and/or by utilizing the first user device 102, second user device 111, the server 140, the server 145, the server 150, the server 160, the communications network 135, any combination thereof, or by utilizing any other appropriate program, network, system, or device.

At step 2104, the method 2100 may include positioning a cup into the container of the rotating device 200. In certain embodiments, the cup may contact the vial/tube when the cup is positioned in the container and the vial containing the sample is positioned in the slot. In certain embodiments, the cup may contact the vial/tube via an O-ring or other similar component affixed and/or attached to the cup itself. In certain embodiments, the positioning of the cup into the container may be performed and/or facilitated by the first user 101, the second user 110 and/or by utilizing the first user device 102, second user device 111, the server 140, the server 145, the server 150, the server 160, the communications network 135, any combination thereof, or by utilizing any other appropriate program, network, system, or device. At step 2106, the method 2100 may include positioning the rotator device 200 within range of a radiation field emitted by the radiation device 800. In certain embodiments, the positioning of the rotator device 200 may be performed and/or facilitated by the first user 101, the second user 110 and/or by utilizing the first user device 102, second user device 111, the server 140, the server 145, the server 150, the server 160, the communications network 135, any combination thereof, or by utilizing any other appropriate program, network, system, or device.

At step 2108, the method 2100 may include activating the rotator device 200. In certain embodiments, the activation of the rotator device 200 may be performed and/or facilitated by the first user 101, the second user 110 and/or by utilizing the first user device 102, second user device 111, the server 140, the server 145, the server 150, the server 160, the communications network 135, any combination thereof, or by utilizing any other appropriate program, network, system, or device. At step 2110, the method 2100 may include transmitting, such as via a driveshaft of the rotator device 200, torque to the cup of the rotator device 200. The torque transmitted to the cup may cause the cup to rotate, thereby causing the cup to rotate the vial/tube containing the sample about a center axis of the vial/tube and/or sample. The angle of the slot and the rotation of the sample about the center axis may facilitate and cause uniform radiation exposure to the sample in the vial/tube when the rotator device 200 is in range of the radiation field of the radiation device 800. In certain embodiments, the transmitting of the torque may be performed and/or facilitated by utilizing by utilizing components of the rotator device 200, the first user device 102, second user device 111, the server 140, the server 145, the server 150, the server 160, the communications network 135, any combination thereof, or by utilizing any other appropriate program, network, system, or device. At step 2112, the method 2100 may include removing the vial/tube from the slot of the rotator device 200 after the sample has been irradiated via the radiation field emitted by the radiation device 800 according to required specifications. In certain embodiments, the removing of the vial/tube may be performed and/or facilitated by the first user 101, the second user 110 and/or by utilizing the first user device 102, second user device 111, the server 140, the server 145, the server 150, the server 160, the communications network 135, any combination thereof, or by utilizing any other appropriate program, network, system, or device. Notably, the method 2100 may further incorporate any of the features and functionality described for the system 100, any other method disclosed herein, or as otherwise described herein.

The systems and methods disclosed herein may include additional functionality and features. In certain embodiments, a sample to be irradiated typically may be placed flat (i.e. 0 degrees) with respect to the radiation field emitted by a radiation device. For example, the sample may be placed at a location within the radiation field that is directly across from the radiation device and is parallel to the perpendicular irradiation plane 810. In such a scenario, the sample would only be irradiated on the side facing the emitter of the radiation device. In order to irradiate the other side of the sample, the sample may need to be flipped along its axis so that the other side may be irradiated. In a preferred embodiment, instead of having the sample being placed flat with respect to the radiation field, the sample may be angled towards the radiation field to improve uniformity of the irradiation. For example, the sample may be angled between 0 and 180 degrees with respect to the perpendicular irradiation plane 810 so as to maximize uniformity and dose. This embodiment enables the sample to be irradiated more effectively and uniformly than the embodiment where the sample is placed flat with respect to the radiation field.

The systems and methods disclosed herein may include further functionality and features. For example, the operative functions of the system 100 and method may be configured to execute on a special-purpose processor specifically configured to carry out the operations provided by the system 100 and method. Notably, the operative features and functionality provided by the system 100 and method may increase the efficiency of computing devices that are being utilized to facilitate the functionality provided by the system 100 and the various methods discloses herein. For example, by training the system 100 over time based on data and/or other information provided and/or generated in the system 100, a reduced amount of computer operations need to be performed by the devices in the system 100 using the processors and memories of the system 100 than compared to traditional methodologies. In such a context, less processing power needs to be utilized because the processors and memories do not need to be dedicated for processing. As a result, there are substantial savings in the usage of computer resources by utilizing the software, techniques, and algorithms provided in the present disclosure. In certain embodiments, various operative functionality of the system 100 may be configured to execute on one or more graphics processors and/or application specific integrated processors.

Notably, in certain embodiments, various functions and features of the system 100 and methods may operate without any human intervention and may be conducted entirely by computing devices. In certain embodiments, for example, numerous computing devices may interact with devices of the system 100 to provide the functionality supported by the system 100. Additionally, in certain embodiments, the computing devices of the system 100 may operate continuously and without human intervention to reduce the possibility of errors being introduced into the system 100. In certain embodiments, the system 100 and methods may also provide effective computing resource management by utilizing the features and functions described in the present disclosure. For example, in certain embodiments, devices in the system 100 may transmit signals indicating that only a specific quantity of computer processor resources (e.g. processor clock cycles, processor speed, etc.) may be devoted to regulating the temperature of the rotator device 200, operating the radiation device 800, and/or performing any other operation conducted by the system 100, or any combination thereof. For example, the signal may indicate a number of processor cycles of a processor may be utilized to facilitate transmission of torque to the cup of the rotator device 200, and/or specify a selected amount of processing power that may be dedicated to generating or any of the operations performed by the system 100. In certain embodiments, a signal indicating the specific amount of computer processor resources or computer memory resources to be utilized for performing an operation of the system 100 may be transmitted from the first and/or second user devices 102, 111 to the various components of the system 100.

In certain embodiments, any device in the system 100 may transmit a signal to a memory device to cause the memory device to only dedicate a selected amount of memory resources to the various operations of the system 100. In certain embodiments, the system 100 and methods may also include transmitting signals to processors and memories to only perform the operative functions of the system 100 and methods at time periods when usage of processing resources and/or memory resources in the system 100 is at a selected value. In certain embodiments, the system 100 and methods may include transmitting signals to the memory devices utilized in the system 100, which indicate which specific sections of the memory should be utilized to store any of the data utilized or generated by the system 100. Notably, the signals transmitted to the processors and memories may be utilized to optimize the usage of computing resources while executing the operations conducted by the system 100. As a result, such functionality provides substantial operational efficiencies and improvements over existing technologies.

Figure 22:
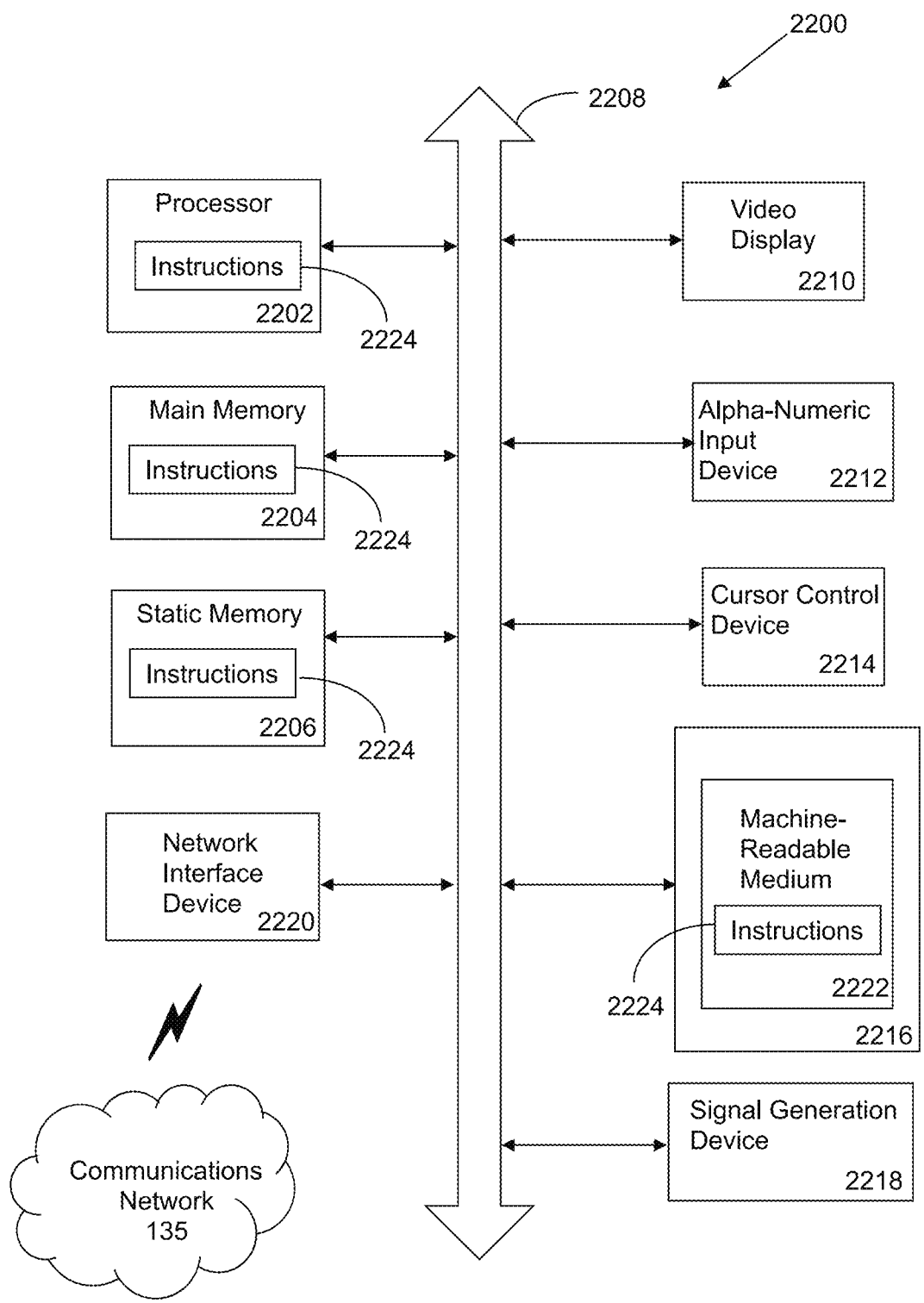
FIG. 22 is a schematic diagram of a machine in the form of a computer system within which a set of instructions, when executed, may cause the machine to perform any one or more of the methodologies or operations of an on-axis, angled, rotator for x-ray irradiation.

Referring now also to FIG. 22, at least a portion of the methodologies and techniques described with respect to the exemplary embodiments of the system 100 can incorporate a machine, such as, but not limited to, computer system 2200, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the rotator device 200, the server 140, the server 145, the server 150, the database 155, the server 160, the radiation device 800, any other system, program, and/or device, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 2200 may include a processor 2202 (e.g., a central processing unit (CPU), a graphics processing unit (GPU, or both), a main memory 2204 and a static memory 2206, which communicate with each other via a bus 2208. The computer system 2200 may further include a video display unit 2210, which may be, but is not limited to, a liquid crystal display (LCD), a flat panel, a solid state display, or a cathode ray tube (CRT). The computer system 2200 may include an input device 2212, such as, but not limited to, a keyboard, a cursor control device 2214, such as, but not limited to, a mouse, a disk drive unit 2216, a signal generation device 2218, such as, but not limited to, a speaker or remote control, and a network interface device 2220.

The disk drive unit 2216 may include a machine-readable medium 2222 on which is stored one or more sets of instructions 2224, such as, but not limited to, software embodying any one or more of the methodologies or functions described herein, including those methods illustrated above. The instructions 2224 may also reside, completely or at least partially, within the main memory 2204, the static memory 2206, or within the processor 2202, or a combination thereof, during execution thereof by the computer system 2200. The main memory 2204 and the processor 2202 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 2222 containing instructions 2224 so that a device connected to the communications network 135, another network, or a combination thereof, can send or receive voice, video or data, and communicate over the communications network 135, another network, or a combination thereof, using the instructions. The instructions 2224 may further be transmitted or received over the communications network 135, another network, or a combination thereof, via the network interface device 2220.

While the machine-readable medium 2222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (nonvolatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A rotator device, comprising:
   a container containing a slot for receiving a sample, wherein an angle of the slot of the container is between 0 and 180 degrees relative to a perpendicular irradiation plane of a radiation device;
   a cup configured to be positioned within an opening of the container and configured to contact the sample when the sample is contained in the slot; and
   a driveshaft configured to transmit torque to cause the cup to be rotated when the cup is positioned within the opening of the container,
      wherein, when the sample resides within the slot and the driveshaft transmits the torque to the cup, the cup causes the sample to rotate about a center axis of the sample, and
      wherein the angle of the slot containing the sample and the rotation of the sample about the center axis facilitate uniform radiation exposure to the sample when the radiation device emits radiation.

2. The rotator device of claim 1, wherein the cup is configured to contact the sample via an o-ring positioned on the cup, an object, or a combination thereof.

3. The rotator device of claim 1, further comprising an insulating sleeve configured to receive a substance for cooling the rotator device, the sample, or a combination thereof.

4. The rotator device of claim 2, wherein the insulating sleeve of the rotator device further comprises a spout for facilitating receipt of the substance into the insulating sleeve.

5. The rotator device of claim 1, wherein the slot comprises a plurality of slots configured to receive a plurality of samples including the sample.

6. The rotator device of claim 1, further comprising an adjustable stand, wherein the container is configured to be placed on the adjustable stand, wherein a mechanism of the adjustable stand is configured to move the container towards or away from the radiation device.

7. The rotator device of claim 1, further comprising a motor for providing power to the driveshaft to cause the driveshaft to provide the torque to the cup.

8. The rotator device of claim 7, further comprising a motor shield for shielding the motor.

9. The rotator device of claim 1, further comprising a cover plate configured to reside between a base of the rotator device and a stand upon which the rotator device is placed.

10. The rotator device of claim 1, wherein the radiation device comprises an x-ray tube, an x-ray emitting device, or a combination thereof.

11. The rotator device of claim 1, further comprising a heating element for providing heat to the rotator device, the sample, or a combination thereof.

12. The rotator device of claim 1, wherein the angle of the slot containing the sample and the rotation of the sample about the center axis facilitate uniform radiation exposure to the sample by enabling a dose rate of radiation at a center of the sample that is substantially equivalent to a dose rate of radiation at a surface of the sample.

13. The rotator device of claim 1, further comprising a tube holder for holding the sample, additional samples, or a combination thereof.

14. A method, comprising:
   positioning a vial containing a sample into a slot of a container of a rotator device, wherein an angle of the slot of the container is between 0 and 180 degrees relative to a perpendicular irradiation plane of a radiation device;

positioning a cup into the container, wherein the cup contacts the vial when the cup is positioned in the container and the vial containing the sample is positioned in the slot;

positioning the rotator device within range of a radiation field of the radiation device; and transmitting, via a driveshaft of the rotator device, torque to the cup, wherein the torque causes the cup to rotate, thereby causing the cup to rotate the vial containing the sample about a center axis of the vial containing the sample, wherein the angle of the slot and the rotation of the sample about the center axis facilitates uniform radiation exposure to the sample in the vial when the radiation device emits radiation.

15. The method of claim 14, further comprising positioning the rotator device on an adjustable stand configured to move the rotator device towards or away from the radiation device.

16. The method of claim 14, further comprising adjusting an amount of torque transmitted to the cup via the driveshaft by using a motor of the rotator device.

17. The method of claim 14, further comprising providing an insulating sleeve configured to receive a substance for adjusting a temperature of the rotator device, the sample in the vial, or a combination thereof.

18. The method of claim 14, further comprising placing the sample at the angle relative to the perpendicular irradiation plane of the radiation device so that cooler photo emission areas are closer in proximity and hotter photo emission areas are further in proximity to the radiation device.

19. The method of claim 14, further comprising emitting the radiation in a direction of the rotator device so as to irradiate the sample in the vial.

20. The method of claim 14, further comprising removing the vial containing the sample after irradiation using the radiation is completed.

21. A device, comprising:
a first container containing a slot for receiving a sample, wherein an angle of the slot of the container is between 0 and 180 degrees relative to a perpendicular irradiation plane of a radiation device;
a second container configured to be positioned within the first container and configured to contact the sample when the sample is contained in the slot; and
a driveshaft configured to transmit torque to the second container to cause the second container to rotate, wherein, when the sample resides within the slot and the second container rotates, the rotation of the second container causes the sample to rotate about a center axis of the sample, and wherein the angle of the slot containing the sample and the rotation of the sample about the center axis facilitate uniform radiation exposure to the sample when the radiation device emits radiation.

22. A device, comprising:
a radiation device configured to emit radiation;
a container;
a first tube positioned in the container and for receiving a first sample;
a second tube positioned in the container and for receiving a second sample,
wherein the second tube is positioned adjacent to the first tube and faces a direction opposing the first tube, and
wherein the first tube and the second tube are positioned at angles relative to a perpendicular irradiation plane of the radiation device such that uniform radiation exposure to the first and second samples occurs when the radiation device emits radiation towards the container.

23. A device, comprising:
a radiation device configured to emit radiation; and
a sample to be irradiated by the radiation device, wherein the sample is positioned at an angle between 0 and 180 degrees relative to a perpendicular irradiation plane of the radiation device, wherein the angle facilitates uniform radiation exposure to the sample when the radiation emits radiation.

24. A method, comprising:
positioning a sample at an angle between 0 and 180 degrees relative to a perpendicular irradiation plane of a radiation device; and
irradiating, by utilizing the radiation device, the sample, wherein the angle of the sample facilitates uniform radiation exposure to the sample when the radiation device emits radiation.

* * * * *